(12) United States Patent
Ozaki et al.

(10) Patent No.: US 9,089,040 B2
(45) Date of Patent: Jul. 21, 2015

(54) HALL THRUSTER, COSMONAUTIC VEHICLE, AND PROPULSION METHOD

(75) Inventors: Toshiyuki Ozaki, Tokyo (JP); Kimiya Komurasaki, Chiba (JP)

(73) Assignee: Mitsubishi Electric Corporation, Tokyo (JP)

( * ) Notice: Subject to any disclaimer, the term of this patent is extended or adjusted under 35 U.S.C. 154(b) by 414 days.

(21) Appl. No.: 13/579,640

(22) PCT Filed: Mar. 1, 2010

(86) PCT No.: PCT/JP2010/053238
§ 371 (c)(1),
(2), (4) Date: Aug. 17, 2012

(87) PCT Pub. No.: WO2011/108060
PCT Pub. Date: Sep. 9, 2011

(65) Prior Publication Data
US 2012/0311992 A1  Dec. 13, 2012

(51) Int. Cl.
*F03H 1/00* (2006.01)
*B64G 1/40* (2006.01)
*H05H 1/54* (2006.01)

(52) U.S. Cl.
CPC ............... *H05H 1/54* (2013.01); *F03H 1/0012* (2013.01); *F03H 1/0037* (2013.01); *F03H 1/0062* (2013.01); *F03H 1/0068* (2013.01); *F03H 1/0075* (2013.01); *B64G 1/405* (2013.01)

(58) Field of Classification Search
CPC ... F03H 1/0037; F03H 1/0062; F03H 1/0068; F03H 1/0075; B64G 1/405
USPC ...................................... 60/200.1, 202, 203.1
See application file for complete search history.

(56) References Cited

U.S. PATENT DOCUMENTS 5,359,258 A  10/1994 Arkhipov et al.
5,475,354 A * 12/1995 Valentian et al. ............. 335/296
(Continued)

FOREIGN PATENT DOCUMENTS

| JP | 05 240143 | 9/1993 |
| JP | 2005 282403 | 10/2005 |

(Continued)

OTHER PUBLICATIONS

Zhurin V. V. et. al., "Physics of closed drift thrusters", Plasma Sources Sci. Technol. vol. 8., pp. R1-R20, (1999).
(Continued)

*Primary Examiner* — Phutthiwat Wongwian
*Assistant Examiner* — William Breazeal
(74) *Attorney, Agent, or Firm* — Oblon, McClelland, Maier & Neustadt, L.L.P.

(57) ABSTRACT

In a Hall thruster 10, an acceleration channel 12 ionizes propellant flowing into an annular discharge space 11 to generate ions, and accelerates and discharges the generated ions. A distributor 37 supplies propellant from a plurality of holes 13 arranged azimuthally, via an anode 14 penetrating to the discharge space 11 of the acceleration channel 12, to the discharge space 11 of the acceleration channel 12, an amount of the propellant varying according to positions of the plurality of holes 13, thereby generating a plurality of regions, between adjacent ones of which the mass flow rate of the propellant is different, azimuthally in the discharge space 11 of the acceleration channel 12. During that time, the distributor 37 adjusts, with respect to the mass flow rate of the propellant in the discharge space 11 of the acceleration channel 12, a differential within a range of 5 to 15% between the mass flow rate of the propellant in a region with a large mass flow rate of the propellant and the mass flow rate of the propellant in a region with a small mass flow rate of the propellant. Thus, the width of a operation parameter region with reduced discharge current oscillation of the Hall thruster 10 is expanded.

14 Claims, 20 Drawing Sheets

(56) References Cited

U.S. PATENT DOCUMENTS

| | | | |
|---|---|---|---|
| 6,215,124 B1* | 4/2001 | King | 250/423 R |
| 6,281,622 B1* | 8/2001 | Valentian et al. | 313/362.1 |
| 2007/0145901 A1 | 6/2007 | Tamida et al. | |
| 2008/0246405 A1 | 10/2008 | Tamida et al. | |

FOREIGN PATENT DOCUMENTS

| | | |
|---|---|---|
| JP | 2006 125236 | 5/2006 |
| JP | 2006 136056 | 5/2006 |
| JP | 2006 136057 | 5/2006 |
| JP | 2007 023914 | 2/2007 |
| JP | 2007 071055 | 3/2007 |
| JP | 2007 120424 | 5/2007 |
| JP | 2007 177639 | 7/2007 |
| JP | 2007 250316 | 9/2007 |
| JP | 2007 257842 | 10/2007 |
| JP | 2008 088931 | 4/2008 |

OTHER PUBLICATIONS

Y. Arakawa et al., "Hall Thruster," Journal of the Japan Society for Aeronautical and Space Sciences, pp. 146-153, vol. 46, (1998).

Tahara, H., "Research and Development of Hall-Effect Thrusters at Osaka Institute of Technology", 44$^{th}$ AIAA/ASME/SAE/ASEE Joint Propulsion Conference and Exhibit, pp. 1-16, AIAA 2008-5086, (Jul. 21-23, 2008).

International Search Report issued on Apr. 13, 2010 in PCT/JP10/053238 filed on Mar. 1, 2010.

Choueiri, E. Y., "Fundamental Difference between the Two Hall Thruster Variants", Physics and Plasmas, pp. 1-11. (Aug. 2001).

Garner, C. E. et al., "Experimental Evaluation of Russian Anode Layer Thrusters", AIAA-94/3010. Total pp. 13, (1994).

Semenkin, A. et al., "RHETT/EPDM Flight Anode Layer Thruster Development", IEPC-97-106, pp. 661-666, (1997).

Yamamoto, N. et al., "Discharge Current Oscillation in Hall Thrusters", Journal of Propulsion and Power, vol. 21, No. 5, pp. 870-876, (Sep.-Oct. 2005).

T. Furukawa et al., "Experiment of Propellant Preheating Effect on Controlling Low-Frequency Oscillation in a Hall Thruster", Journal of the Japan Society for Aeronautical and Space Sciences, vol. 50, No. 583, pp. 325-329, (2002), (with English Abstract).

Nejoh, Y. et al., "Investigation of Ion Current Oscillations and Erosion of the Wall with Cross-field Ion Transport in Hall Thrusters", pp. 1-6, ISTS, 2009-b-13, (2009).

S. Yokota et al., "Numerical Analysis of the Sheath Structure and Discharge Current Oscillation in an Anode-Layer Hall Thruster", Journal of the Hapan Society for Aeronautical and Space Sciences, vol. 54, No. 632, pp. 413-418. (2006), (with English Abstract).

Boeuf, J. P. et al., "Low frequency oscillations in a stationary plasma thruster", Journal of Applied Physics, vol. 84, No. 7, 3541-3554, (Oct. 1, 1998).

Choueiri, E. Y., "Plasma oscillations in Hall thrusters", Physics of Plasmas, vol. 8, No. 4, pp. 1411-1426, (Apr. 2001).

Fife, J. M. et al., "A numerical study of low-frequency discharge oscillations in Hall thrusters", AIAA Meeting Papers on Disc., A97-36294, AIAA Paper 97-3052, pp. 1-11, (Jul. 1997).

Marchandise, F. R. et al., "The PPS 1350 qualification demonstration 7500h on ground, about 5000h in flight", IEPC-2005-209, pp. 1-13, (Oct. 31-Nov. 4, 2005).

Tamida, T. et al., "Determining parameter sets for low-frequency-oscillation-free operation of Hall thruster", Journal of Applied Physics, vol. 102, pp. 043304-1/6, (2007).

Nagao, N. et al., "Development of a two-dimensional dual pendulum thrust stand for Hall thrusters", AIP, Review of Scientific Instruments, vol. 78, pp. 115108-1/4, (2007).

Yamamoto, N. et al., "Condition of Stable Operation in a Hall Thruster", IEPC-03-086, total pp. 6, (2003).

Kim, V. et al.,"Electric Propulsion Activity in Russia", IEPC-01-05, total pp. 7, (Oct. 2001).

Semenkin, A. V. et al., "Operating Envelopes of Thrusters with Anode Layer", IEPC-2001-013, pp. 1-11, (2001).

Meezan, N. B. et al., "Anomalous electron mobility in a coaxial Hall discharge plasma", Physical Review E, vol. 63., pp. 026410-1/7, (2001).

M. Hirakawa et al., "Particle Simulation of Plasma in Electric Propulsion Thrusters", Journal of the Japan Society for Aeronautical and Space Sciences, pp. 444-452, (Aug. 1997).

Baranov, V. et al., "Azimuthal Non-uniformities in Accelerators with Closed Electron Drift", IEPC-01-18, pp. 1-8, (Oct. 2001).

Choueiri, E.Y., "Fundamental Difference between the Two Variants of Hall Thrusters: SPT and TAL", AIAA-2001-3504, pp. 1-12, (Jul. 2001).

Y. Fukushima et al., "Discharge Stabilization for an Anode-Layer-Type Hall Thruster by Azimuthally Nonuniform Propellant Supply", Journal of the Japan Society for Aeronautical and Space Sciences, vol. 58, No. 672, pp. 8-14, (2010), (with English Abstract).

Y. Fukushima et al., "Discharge Stabilization Method of an Anode Layer Type Hall Thruster by Non-uniform Propellant Flow", IEPC-2009-148, pp. 1-8, (Sep. 2009).

Y. Arakawa et al., "Electric Propulsion, Hall Thruster, Thruster Performance", pp. 146-153, vol. 46, (1998).

Garner, C. E. et al., "Experimental Evaluation of Russian Anode Layer Thrusters", AIAA-94-301. Total pp. 13, (1994).

T. Furukawa et al., "Experiment of Propellant Preheating Effect on Controlling Low-Frequency Oscillation in a Hall Thruster", vol. 50, No. 583, pp. 325-329, (2002), (with English Abstract).

Nejoh, Y. et al., "Investigation of Ion Current Oscillations and Erosion of the Wall with Cross-field Ion Transport in Hall Thrusters", pp. 1-6, 2009-b-13, (2009).

S. Yokota et al., "Numerical Analysis of the Sheath Structure and Discharge Current Oscillation in an Anode-Layer Hall Thruster", vol. 54, No. 632, pp. 413-418. (2006), (with English Abstract).

Boeuf, J. P. et al., "Low frequency oscillations in a stationary plasma thruster", Journal of Applied Physics, vol. 84, No. 7, 3540-3554, (Oct. 1, 1998).

Fife, J. M. et al , "A numerical study of low-frequency discharge oscillations in Hall thrusters", AIAA Meeting Papers on Disc., A97-36294, AAIA Paper 97-3052, pp. 1-11, (Jul. 1997).

Semenkin, A. V. et al., "Operating Envelopes of Thrusters with Anode Layer", pp. 1-11, (2001).

Meezan, N. B. et al., "Anomalous electron mobility in a coaxial Hall discharge plasma", Physical Review E, vol. 63., pp. 0246410-1/7, (2001).

M. Hirakawa et al., "Particle Simulation of Plasma in Electric Propulsion Thrusters", pp. 444-452, (Aug. 1997).

Choueiri, E.Y., "Fundamental Difference between the Two Variants of Hall Thrusters: SPT and TAL", AIA-2001-3504, pp. 1-12, (Jul. 2001).

Y. Fukushima et al., "Discharge Stabilization Method of an Anode Layer Type Hall Thruster by Non-uniform Propellant Flow", vol. 58, No. 672, pp. 8-14, (2010), (with English Abstract).

Y. Fukushima et al., "Discharge Stabilization for an Anode-Layer-Type Hall Thruster by Azimuthally Non-uniform Propellant Supply", IEPC-2009-148, pp. 1-8, (Sep. 2009).

* cited by examiner

////  SUYB1 (Iron)
▓▓▓▓  Cu (Copper)
\\\\  BN (Boron nitride)
////  SUS304 (Stainless steel)

Fig. 13

| NORMALIZED DIFFERENTIAL OF MASS FLOW RATE | 0.0 | 0.1 | 0.2 |
|---|---|---|---|
| INPUT POWER, W | 580 | 620 | 690 |
| THRUST, mN | 38 | 36 | 35 |
| SPECIFIC IMPULSE, s | 1400 | 1400 | 1300 |
| THRUST EFFICIENCY | 0.45 | 0.39 | 0.33 |
| OPERATION REGION WIDTH, mT | 44-48 | 42-64 | 45-80 AND OVER |

Fig. 14

| THRUSTER | SPT-50 | SPT-70 | SPT-100 | D-38M | D-55 |
|---|---|---|---|---|---|
| SPECIES | M | M | M | A | A |
| INPUT POWER, W | 350 | 700 | 1350 | 300 | 1600 |
| THRUST, mN | 20 | 40 | 80 | 15 | 100 |
| SPECIFIC IMPULSE, s | 1100 | 1500 | 1600 | 1500 | 1900 |
| THRUST EFFICIENCY | 0.35 | 0.45 | 0.50 | 0.37 | 0.60 |

HALL THRUSTER, COSMONAUTIC VEHICLE, AND PROPULSION METHOD

TECHNICAL FIELD

The present invention relates to a Hall thruster, a cosmonautic vehicle, and a propulsion method. The present invention relates to, in particular, a Hall thruster in which discharge oscillation is suppressed.

BACKGROUND ART

A Hall thruster generating thrust using plasma is known as one of electric propulsion devices used for orbit control and attitude control of cosmonautic vehicles such as satellites, spacecrafts, etc. (refer to Patent Literature 1 to 11).

CITATION LIST

Patent Literature

Patent Literature 1: JP 2008-88931 A
Patent Literature 2: JP 2007-257842 A
Patent Literature 3: JP 2007-250316 A
Patent Literature 4: JP 2007-177639 A
Patent Literature 5: JP 2007-120424 A
Patent Literature 6: JP 2007-23914 A
Patent Literature 7: JP 2006-136057 A
Patent Literature 8: JP 2006-136056 A
Patent Literature 9: JP 2006-125236 A
Patent Literature 10: JP 2005-282403 A
Patent Literature 11: JP 5-240143 A

Non Patent Literature

Non Patent Literature 1: Zhurin, V. V., Kaufman, H. R. and Robinson, R. S.: Physics of closed drift thrusters, Plasma Sources Science and Technology, 8 (1999), R1-R20

Non Patent Literature 2: Yoshihiro ARAKAWA, Kimiya KOMURASAKI, Miharu HIRAKAWA: Hall Thruster, Journal of the Japan Society for Aeronautical and Space Sciences, 46 (1998), pp. 146-153

Non Patent Literature 3: Tahara, H.: Research and Development of Hall-Effect Thrusters at Osaka Institute of Technology, AIAA Paper 2008-5086, 2008

Non Patent Literature 4: Choueiri, E. Y.: Fundamental Difference between the Two Hall Thruster Variants, Physics of Plasmas, 8 (2001), pp. 5025-5033

Non Patent Literature 5: Garner, C. E., Brophy, J. R., Polk, J. E., Semenkin, S., Garkusha, V., Tverdokhlebov, S. and Marrese, C.: Experimental Evaluation of Russian Anode Layer Thrusters, AIAA Paper 94-3010, 1994

Non Patent Literature 6: Semenkin, A., Kochergin, A., Garkusha, V., Chislov, G and Rusakov, A.: RHETT/EPDM Flight Anode Layer Thruster Development, IEPC Paper 97-106, 1997

Non Patent Literature 7: Yamamoto, N., Komurasaki, K. and Arakawa, Y.: Discharge Current Oscillation in Hall Thrusters, Journal of Propulsion and Power, 21 (2005), pp. 870-876

Non Patent Literature 8: Takeshi FURUKAWA, Takeshi MIYASAKA, Toshi FUJIWARA: Experiment of Propellant Preheating Effect on Controlling Low-Frequency Oscillation in a Hall Thruster, Journal of the Japan Society for Aeronautical and Space Sciences, 50 (2002), pp. 325-329

Non Patent Literature 9: Nejoh, Y., Maruko, Y., Yamamura, Y., and Tahara, H.: Investigation of Ion Current Oscillations and Erosion of the Wall with Cross-field Ion Transport in Hall Thrusters, ISTS Paper 2009-b-13, 2009

Non Patent Literature 10: Shigeru YOKOTA, Shinsuke YASUI, Ken KUMAKURA, Kimiya KOMURASAKI, Yoshihiro ARAKAWA: Numerical Analysis of the Sheath Structure and Discharge Current Oscillation in an Anode-Layer Hall Thruster, Journal of the Japan Society for Aeronautical and Space Sciences, 54 (2006), pp. 39-44

Non Patent Literature 11: Boeuf, J. P. and Garrigues, L.: Low frequency oscillations in a stationary plasma thruster, Journal of Applied Physics, 84 (1998), pp. 3541-3554

Non Patent Literature 12: Choueiri, E. Y.: Plasma oscillations in Hall thrusters, Physics of Plasmas, 8 (2001), pp. 1411-1426

Non Patent Literature 13: Fife, J. M., Martinez, S. M. and Szabo, J.: A numerical study of low-frequency discharge oscillations in Hall thrusters, AIAA Paper 97-3052, 1997

Non Patent Literature 14: Marchandise, F. R., Biron, J., Gambon, M., Cornu, N., Darnon, F. and Estublier, D.: The PPS 1350 qualification demonstration 7500 h on ground, about 5000 h in flight, IEPC Paper 2005-209, 2005

Non Patent Literature 15: Tamida, T., Nakagawa, T., Suga, I., Osuga, H., Ozaki, T. and Matsui, K.: Determining parameter sets for low-frequency-oscillation-free operation of Hall thruster, Journal of Applied Physics, 102 (2007), pp. 043304-1-6

Non Patent Literature 16: Nagao, N., Yokota, S., Komurasaki, K. and Arakawa, Y.: Development of a two-dimensional dual pendulum thrust stand for Hall thrusters, Review of Scientific Instruments, 78 (2007), pp. 115108-1-4

Non Patent Literature 17: Yamamoto, N., Komurasaki, K. and Arakawa, Y: Condition of Stable Operation in a Hall Thruster," IEPC Paper 2003-086, 2003

Non Patent Literature 18: Kim, V., Popov, G, Arkhipov, B., Murashko, V., Gorshkov, O., Koroteyev, A., Garkusha, V., Semenkin, A. and Tverdokhlebov, S.: Electric Propulsion Activity in Russia, IEPC Paper 2001-005, 2001

Non Patent Literature 19: Semenkin, A. V., Tverdokhlebov, S. O., Garkusha, V. I., Kochergin, A. V., Chislov, G O., Shumkin, B. V., Solodukhin, A. V. and Zakharenkov, L. E.: Operating Envelopes of Thrusters with Anode Layer, IEPC Paper 2001-013, 2001

Non Patent Literature 20: Meezan, N. B., Hargus, Jr., W. A. and Cappelli, M. A.: Anomalous electron mobility in a coaxial Hall discharge plasma, Physical Review E, 63 (2001), pp. 026410-1-7

Non Patent Literature 21: Miharu HIRAKAWA, Yoshihiro ARAKAWA: Particle Simulation of Plasma in Electric Propulsion Thrusters, Journal of the Japan Society for Aeronautical and Space Sciences, 45 (1997), pp. 444-452

Non Patent Literature 22: Baranov, V., Nazarenko, Y. and Petrosov, V.: Azimuthal Non-uniformities in Accelerators with Closed Electron Drift, IEPC Paper 2001-018, 2001

SUMMARY OF INVENTION

Technical Problem

A Hall thruster (refer to Non Patent Literature 1 to 3) is an electric propulsion device to ionize and accelerate propellant, while retaining the potential gradient by the confinement of electron by the magnetic field. A Hall thruster has high thrust efficiency at the specific impulse in the region of 1,000 to 3,000 s (seconds), and further has higher thrust density than an ion thruster because of being unconstrained by the space-charge limited current rule, thereby implementing a small/lightweight propulsion system. With these features, a Hall thruster has drawn attention as a thruster suitable for near-Earth missions such as attitude control and orbit transition of a satellite, etc. Among different types of a Hall thruster, it is said that the anode layer type Hall thruster (refer to Non Patent Literature 4) has several advantages compared with the magnetic layer type which is popularly used at present, such as implementing a higher thrust density and having generally less wall erosion since the discharge chamber is short and ion loss to the wall is small (refer to Non Patent Literature 5 and 6). The anode layer type Hall thruster is expected to improve the usability of a Hall thruster. However, the anode layer type still has not reached practical use since there is a problem that the discharge current largely oscillates in the region of 10 to 100 kHz (kilohertz) in most operation parameter regions, which causes heavy load on the power source and the circuit. Therefore, it is a serious problem in Hall thruster development to reduce the discharge current oscillation of the anode layer type Hall thruster.

Until now, lots of studies have been conducted to clarify the oscillation phenomena of the discharge current and establish a method for reducing the oscillation (refer to Non Patent Literature 7 to 13) because of the above reasons, for the anode layer type, and because the relation between the oscillation and the wall erosion has not been clarified quantitatively, for the magnetic layer type. In recent years, guidelines have been obtained, showing that it is possible to reduce the oscillation by, for instance, the decrease of an exit area of the discharge chamber (refer to Non Patent Literature 7). Further, it has been reported that, in the magnetic layer type, the oscillation is reduced by preheating the propellant before supplying it to the discharge chamber (refer to Non Patent Literature 8). Recently, it has been reported that, by the wall erosion due to the long-hour operation, the oscillation amplitude of the discharge current increases as time passes (refer to Non Patent Literature 3). Further, the oscillation analysis focused on actions of ions has been also attempted (refer to Non Patent Literature 9). When limited to a case of the anode layer type, the use of hollow anode (refer to Non Patent Literature 6, 7, and 10) is an example of the most typical measure to reduce the oscillation; however, even when the hollow anode is used, the operation region with small-amplitude oscillation is still narrow, and practical use has not been reached.

The present invention aims to, for instance, expand the width of operation parameter region with reduced discharge current oscillation of a Hall thruster.

Solution to Problem

A Hall thruster according to one aspect of the present invention includes:

an acceleration channel forming an annular discharge space, ionizing propellant flowing into the discharge space to generate ions, and accelerating and discharging the generated ions;

an anode penetrating to the discharge space of the acceleration channel; and a distributor having a plurality of holes arranged azimuthally, supplying propellant from the plurality of holes via the anode to the discharge space of the acceleration channel, an amount of the propellant varying according to positions of the plurality of holes, thereby generating a plurality of regions, between adjacent ones of which a mass flow rate of the propellant is different, azimuthally in the discharge space of the acceleration channel, and adjusting, with respect to the mass flow rate of the propellant in the discharge space of the acceleration channel, a differential within a range of 5 to 15% between the mass flow rate of the propellant in a region with a large mass flow rate of the propellant and the mass flow rate of the propellant in a region with a small mass flow rate of the propellant.

Advantageous Effects of Invention

In one aspect of the present invention, propellant is supplied from a plurality of holes provided at a distributor of a Hall thruster, via an anode to a discharge space of an acceleration channel, an amount of the propellant varying according to positions of the plurality of holes, so that a plurality of regions, between adjacent ones of which a mass flow rate of the propellant is different, are generated azimuthally in the discharge space of the acceleration channel. During that time, with respect to the mass flow rate of the propellant in the discharge space of the acceleration channel, a differential between the mass flow rate of the propellant in a region with a large mass flow rate of the propellant and the mass flow rate of the propellant in a region with a small mass flow rate of the propellant is adjusted within a range of 5 to 15%. Thus, the discharge current oscillation of the Hall thruster is reduced.

BRIEF DESCRIPTION OF DRAWINGS

FIG. 13 is a table showing, of the Hall thruster according to the first embodiment, performance at the maximum efficiency point that satisfies $\Delta$<0.2, and magnetic flux density width of a region of $\Delta$<0.2 including the point, in each differential of the mass flow rate.

FIG. 14 is a table showing performance of a typical magnetic layer type (M) and anode layer type (A).

DESCRIPTION OF EMBODIMENTS

Hereinafter, embodiments of the present invention will be explained with reference to the figures.

Embodiment 1.

In the following, signs used for explaining the present embodiment will be explained.

[Equation 1]

B: magnetic flux density
E: electric field
e: elementary electric charge
F: thrust
$I_b$: beam current
$I_d$: discharge current
$I_e$: electron current flowing to channel
$I_g$: current flowing to guard ring
$k_B$: Boltzmann constant
$m_e$: electron mass
$\dot{m}_{dif}$: mass flow rate differential between high density region and low density region
$\dot{m}_{tot}$: anode total propellant mass flow rate
$n_e, n_n$: electron number density and a neutral particle number density
r: radial component of cylindrical coordinate
$T_e$: electron temperature
$V_d$: discharge voltage
$v_e$: electron velocity
z: axial component of cylindrical coordinate
Δ: oscillation amplitude
φ: electric potential
$\eta_t, \eta_u$: thrust efficiency and propellant use efficiency
$v_{en}$: electron-neutral collision frequency
θ: azimuthal component of cylindrical coordinate
τ: measuring time of discharge current
Suffix
A: high density region
B: low density region Here, in the description, the mass flow rate differential between a high density region and a low density region is expressed as $m_{dif}$, and the anode total propellant mass flow rate is expressed as $m_{tot}$.

Figure 1:
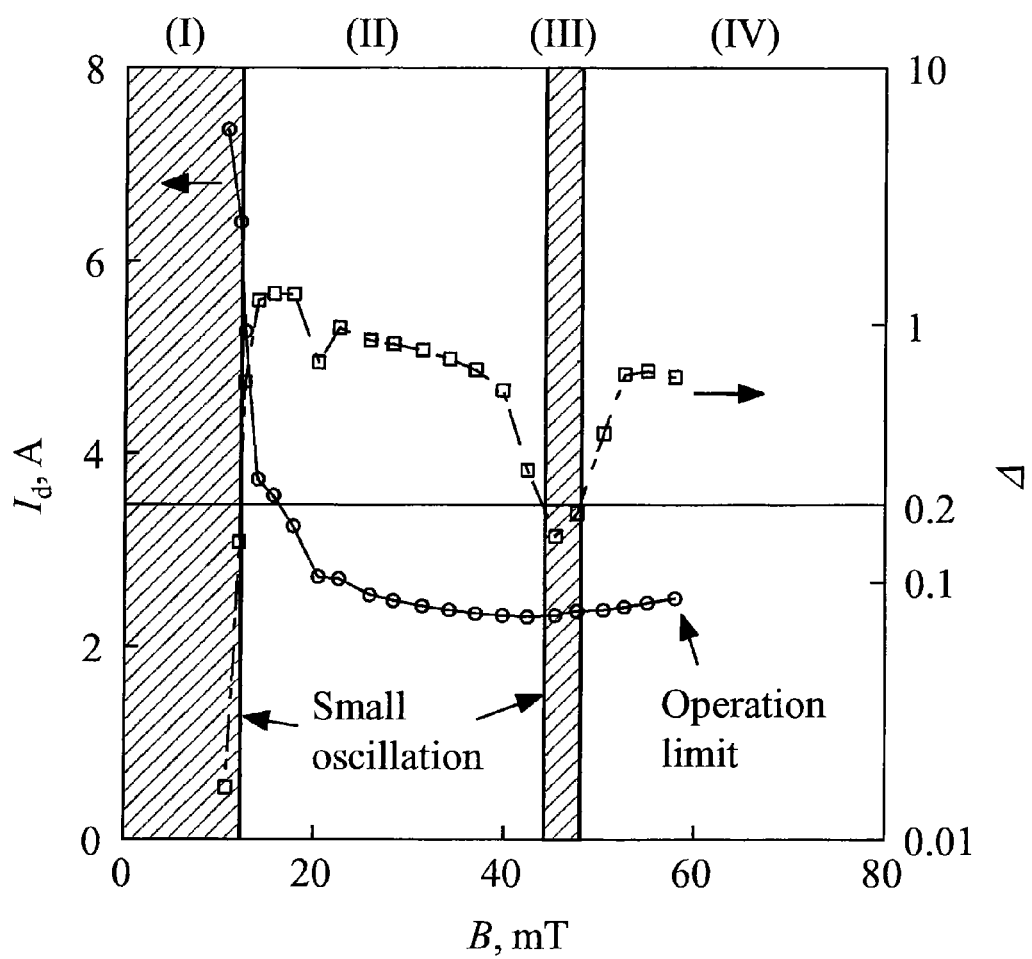
FIG. 1 is a graph showing variation ($m_{tot}$=2.73 mg/s, $V_d$=250 V, hollow anode width is 3 mm) of operating characteristic (discharge current $I_d$ and oscillation amplitude $\Delta$) of an anode layer type with respect to magnetic flux density B.
Figure 2:
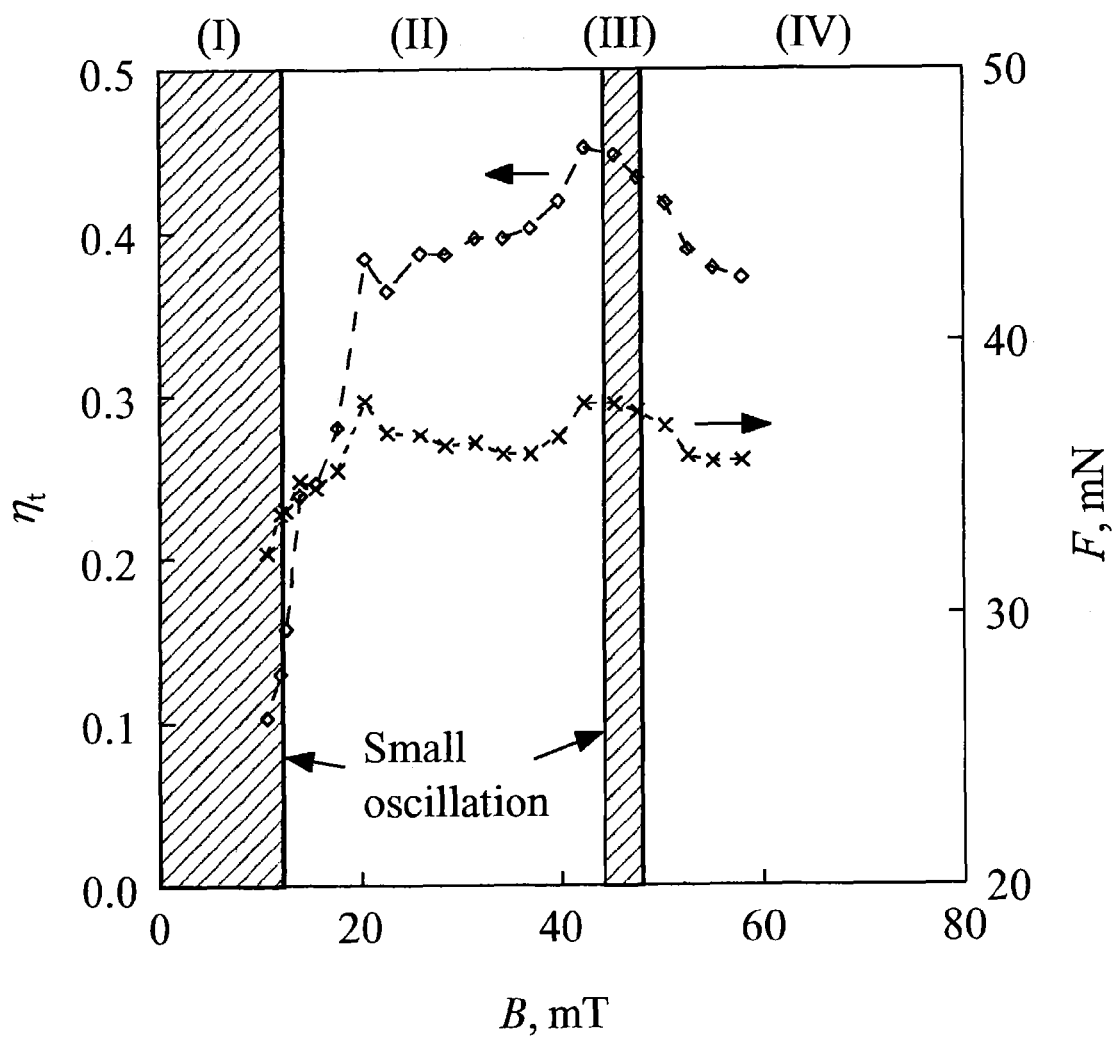
FIG. 2 is a graph showing variation ($m_{tot}$=2.73 mg/s, $V_d$=250 V, hollow anode width is 3 mm) of operating characteristic (thrust efficiency $\eta_t$ and thrust F) of the anode layer type with respect to magnetic flux density B.

The discharge characteristic of an anode layer type Hall thruster depends largely on, among operation parameters (the magnetic flux density: B, the total propellant mass flow rate: $m_{tot}$, and the discharge voltage: $V_d$), the magnetic flux density B in particular (refer to Non Patent Literatures 7, 10 to 12). FIGS. 1 and 2 show variation of the operating characteristic of the anode layer type Hall thruster, to which an oscillation control is applied by a hollow anode, with respect to the magnetic flux density B. FIG. 1 is a graph showing variation of the discharge current $I_d$ (unit: A (ampere)) and variation of the oscillation amplitude Δ of the anode layer type Hall thruster with respect to the magnetic flux density B (unit: mT (millitesla)). FIG. 2 is a graph showing variation of the thrust efficiency $\eta_t$ and variation of the thrust F (unit: mN (millinewton)) of the anode layer type Hall thruster with respect to the magnetic flux density B. The anode total propellant mass flow rate $m_{tot}$ is 2.73 mg/s (milligram per second), the discharge voltage $V_d$ is 250 V (volt), and the hollow anode width is 3 mm (millimeter). Here, the oscillation amplitude Δ and the thrust efficiency $\eta_t$ are defined by the following equations.

[Equation 2]

$$\Delta \equiv \frac{1}{\overline{I_d}} \sqrt{\frac{\int_0^\tau (I_d - \overline{I_d})^2 dt}{\tau}} \left( \overline{I_d} \equiv \frac{\int_0^\tau I_d dt}{\tau} \right) \quad (1)$$

$$\eta_t \equiv \frac{F^2}{2\dot{m}_{tot} I_d V_d} \quad (2)$$

In a magnetic layer type Hall thruster which is practically used, the oscillation amplitude Δ at an operating point is normally around 0.2 (refer to Non Patent Literature 14 and 15), and it can be determined that the oscillation with the amplitude of at most 0.2 or less does not produce load to the power source, etc. to the degree of causing a problem in an actual equipment implementation. Thus, in the present embodiment, it is assumed that Δ<0.2 is a necessary condition for practical use of the anode layer type Hall thruster. Further, when this is satisfied, it is defined that the oscillation is small. In FIG. 1, Δ<0.2 is satisfied in the regions (I) and (III). However, in the region (I), the thrust efficiency $\eta_t$ is low due to the extremely large discharge current $I_d$. On the other hand, in the region (III), although the thrust efficiency $\eta_t$ is high, the operating characteristic susceptibly changes with respect to the magnetic flux density B, and the magnetic flux density width of a region of stable operation is narrow, such as 44 to 48 mT.

In the present embodiment, as a new method to reduce the oscillation, the propellant is supplied to an acceleration channel at a mass flow rate which varies according to azimuthal positions. An oscillation reduction effect of an azimuthally non-uniform propellant mass flow rate was found in the study of the thrust vector control according to the mass flow rate differential between the right and left of the channel (refer to Non Patent Literature 16). Here, this method is applied to an anode layer type Hall thruster, trying to extend the operation region with small-amplitude oscillation.

Hereinafter, an experimental setup used for an experiment of the present embodiment will be explained.

First, with reference to FIGS. 3 and 4, a Hall thruster 10 according to the present embodiment will be explained.

Figure 3:
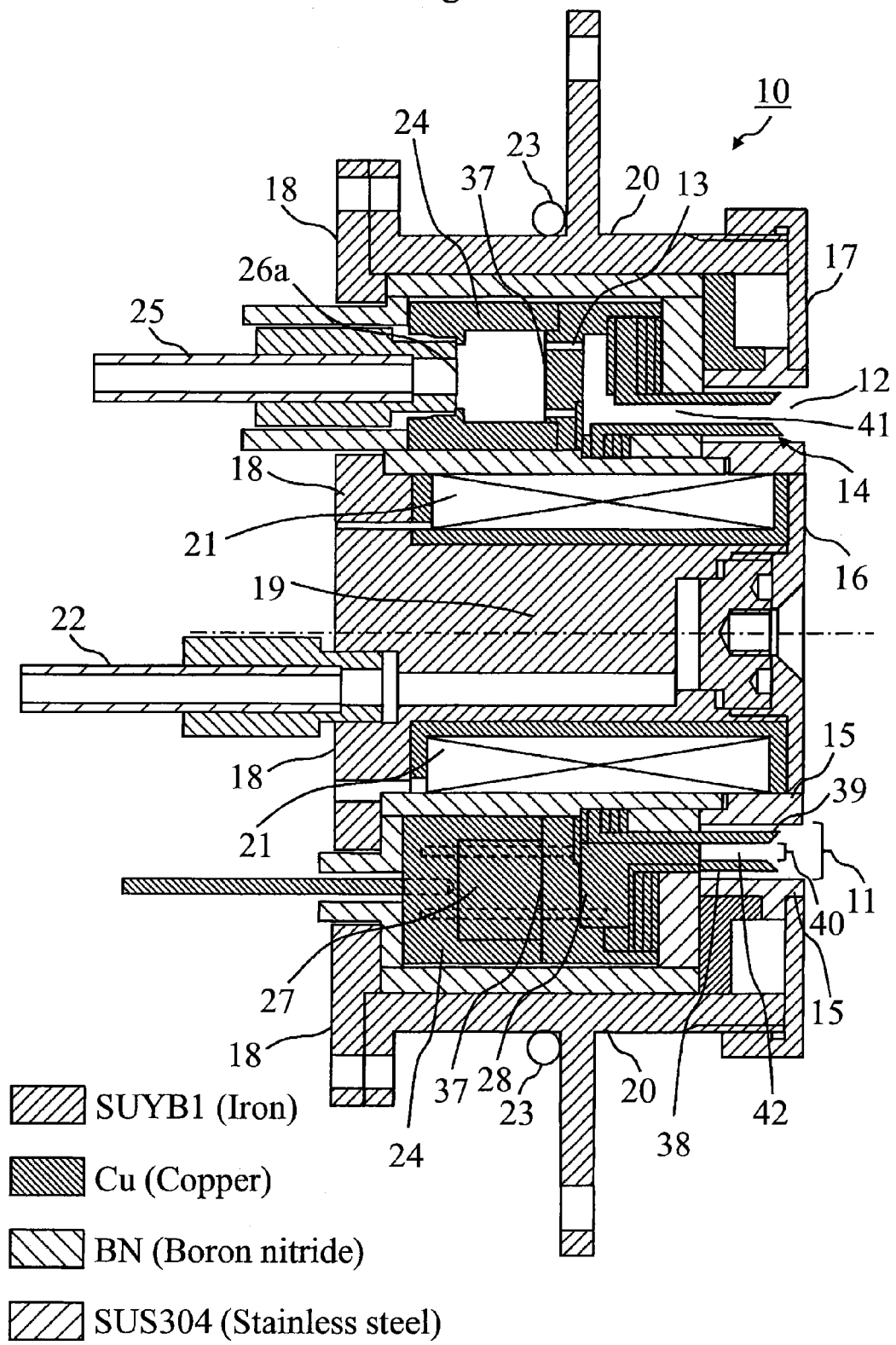
FIG. 3 is a cross sectional view of a Hall thruster according to the first embodiment.

FIG. 3 shows a cross sectional view of the anode layer type Hall thruster 10 used in the experiment. As shown in FIG. 3, the Hall thruster 10 according to the present embodiment includes an acceleration channel 12 which forms an annular discharge space 11, an anode 14 which penetrates to the discharge space 11 of the acceleration channel 12, and a tabular distributor 37.

The acceleration channel 12 ionizes the propellant flowing into the discharge space 11 to generate ions, and accelerates and discharges the generated ions. With this operation, the thrust F is obtained. The acceleration channel 12 used in the experiment has the inner diameter of 48 mm, the outer diameter of 62 mm, and the length of 3 mm. The wall face of the acceleration channel 12 is a guard ring 15 made of SUS304 maintained at the cathodic potential. The distributor 37 provided with a plurality of holes 13 is arranged at the upstream of the anode 14. The plurality of holes 13 provided at the distributor 37 are arranged azimuthally. The anode 14 stands from a tabular surface of the distributor 37 and includes an external annular wall 38 and an internal annular 39 which are arranged so as to face with each other with a gap. The gap between the external annular wall 38 and the internal annular wall 39 forms an annular space 40 which communicates with the discharge space 11 of the acceleration channel 12. In the experiment, a hollow anode with the thickness of 1 mm and the width of 3 mm, which has been proved to have the most excellent oscillation reduction effect according to the past study (refer to Non Patent Literature 17), is used for the anode 14. The distributor 37 supplies propellant from the plurality of holes 13 via the anode 14 to the discharge space 11 of the acceleration channel 12, an amount of the propellant varying according to positions of the holes 13, thereby generating a plurality of regions, between adjacent ones of which the mass flow rate of the propellant is different, azimuthally in the discharge space 11 of the acceleration channel 12. During that time, the distributor 37 adjusts, with respect to the propellant mass flow rate $m_{tot}$ in the discharge space 11 of the acceleration channel 12, a differential $m_{dif}$ to a certain rate between the propellant mass flow rate $m_A$ in a region with a large propellant mass flow rate and the propellant mass flow rate $m_B$ in a region with a small propellant mass flow rate. This rate is preferably within a range of 5 to 15%, the most preferably 10%, from an experiment result which will be discussed later.

As shown in FIG. 3, the Hall thruster 10 according to the present embodiment further includes an iron internal magnetic pole 16 arranged at the center, an iron external magnetic pole 17 arranged at the outer side of the same surface as the internal magnetic pole 16, an iron bottom wall 18, an iron core 19, an iron side wall 20, and a solenoidal coil 21. These components form a magnetic circuit. Here, respective components may be made from high-permeability magnetic material other than iron.

The internal magnetic pole 16 forms an annular-plate ring shape and is supported by the cylindrical iron core 19 arranged in a standing manner in the off-plate direction of the internal magnetic pole 16. The internal magnetic pole 16 and the bottom wall 18 are connected with the iron core 19. The external magnetic pole 17 forms an annular-plate ring shape and is supported by the side wall 20 arranged annularly in a standing manner in the off-plate direction of the external magnetic pole 17. The external magnetic pole 17 and the bottom wall 18 are connected with the side wall 20. That is, the internal magnetic pole 16, the external magnetic pole 17, and the bottom wall 18 are supported by the iron core 19 and the side wall 20, forming a birdcage-like shape.

In the experiment, a radial direction magnetic field B, in the acceleration channel 12 is generated by the solenoidal coil 21 wound on the iron core 19 of the central axis of the Hall thruster 10. It is possible to generate the magnetic field of 80 mT at the maximum by flowing electric current of 6 A in the solenoidal coil 21. In order to prevent the Hall thruster 10 from overheating due to heat generation of the solenoidal coil 21 and heat input to the anode 14, the inside of the iron core 19 and the side surface of the Hall thruster 10 are cooled by water. The inside of the iron core 19 and the outer circumference of the side wall 20 are provided with cooling parts 22 and 23 for flowing water. Here, coolant other than water can be flown to the cooling parts 22 and 23.

As shown in FIG. 3, the Hall thruster 10 according to the present embodiment further includes a plenum chamber 24 segmented into a plurality of sections azimuthally corresponding to the plurality of regions, respectively, and propellant injecting parts 25 for injecting the propellant to the plenum chamber 24. The Hall thruster 10 used in the experiment is configured to generate four regions as the plurality of regions, between adjacent ones of which the mass flow rate of the propellant is different, azimuthally in the discharge space 11 of the acceleration channel 12. FIG. 4 shows a perspective view of four separated diffusion chambers inside the plenum chamber 24. Each diffusion chamber corresponds to each of the plurality of sections. As shown in FIG. 4, the plenum chamber 24 has ports 26a and 26b to which the propellant is injected for each diffusion chamber. The propellant injecting parts 25 are provided for the respective ports 26a and 26b, having a plurality of tubular parts connected to the ports 26a and 26b, respectively. The propellant is supplied from a tank, not shown, through a plurality of flow rate adjusters, not shown, provided for each tubular part of the propellant injecting parts 25, to each tubular part of the propellant injecting parts 25.

In the experiment, Xe (Xenon) gas with 99.999% degree of purity is used for the propellant. The propellant is injected to ports 26a and 26b of the plenum chamber 24 for each diffusion chamber of the plenum chamber 24 after the injecting amount thereof is adjusted for each diffusion chamber by the propellant injecting part 25. The propellant injected to each of the ports 26a and 26b of the plenum chamber 24 for each diffusion chamber is supplied from, among the plurality of holes 13 provided at the distributor 37, each hole 13 penetrating to the region corresponding to each diffusion chamber through the anode 14, to the discharge space 11 of the acceleration channel 12. That is, the propellant is supplied from four ports 26a and 26b provided at the back surface of the Hall thruster 10 to the diffusion chambers, and reaches the acceleration channel 12 through the anode 14.

In order to supply the propellant to the acceleration channel 12 with azimuthally non-uniform mass flow rate, partitions 27 and 28 are provided at 90-degree intervals inside the diffusion chambers and the anode 14.

Therefore, the plenum chamber 24 is divided into four equal sections by the partitions 27 in the azimuthal direction.

In the distributor 37 provided at the upstream of the anode 14, each of four holes 13 is formed between each two partitions 28; the holes 13 are arranged equally in the azimuthal direction. For instance, the distributor 37 is provided with an annular hole, and the partitions 28 are pinned at four points of the hole to divide the hole into four, thereby forming the above four holes 13.

As discussed above, in the present embodiment, the anode 14 stands from the tabular surface of the distributor 37 between the external annular wall 38 and the internal annular wall 39, and includes a plurality of partitions 28 for segmenting the annular space 40 formed between the external annular wall 38 and the internal annular wall 39 into a plurality of sections azimuthally corresponding to the previously-described plurality of regions, respectively.

In the Hall thruster 10 used for the experiment, the annular space 40 between the external annular wall 38 and the internal annular wall 39 of the anode 14 is segmented into four sections by the partitions 28 (division walls), thereby forming a branching flow passage 41 corresponding to each section. Each branching flow passage 41 of the anode 14 and each diffusion chamber of the plenum chamber 24 communicates with each other, and connects to the corresponding one of the ports 26a and 26b.

In order not to prevent the internal discharge (refer to Non Patent Literature 10), the partitions 28 inside the anode 14 do not extend beyond the positions 10 mm upstream (around three times of the length of the acceleration channel 12, around one thirds of the length of each branching flow passage 41) from the edge of the anode 14. That is, the height of the partition 28 from the bottom part of the anode 14 is made lower than the height from the bottom part of the anode 14 to the opening surface (the edge surface at the opening side of the external annular wall 38 and the edge surface at the opening side of the internal annular wall 39) of the anode 14. Then, a space that is not segmented by the partitions 28 is provided between the external annular wall 38 and the internal annular wall 39 in the vicinity of the opening surface of the anode 14. With this space, each branching flow passage 41 merges at a merging part 42.

As discussed above, in the present embodiment, the distributor 37 is provided with a plurality of holes 13 with an equal interval in the azimuthal direction. The propellant, the mass flow rate of which is controlled, is supplied to each branching flow passage 41 of the anode 14 through the holes 13 of the distributor 37. The propellant which has passed through each branching flow passage 41 is supplied to the discharge space 11 of the acceleration channel 12, with maintaining the ratio of the mass flow rate.

Figure 4:
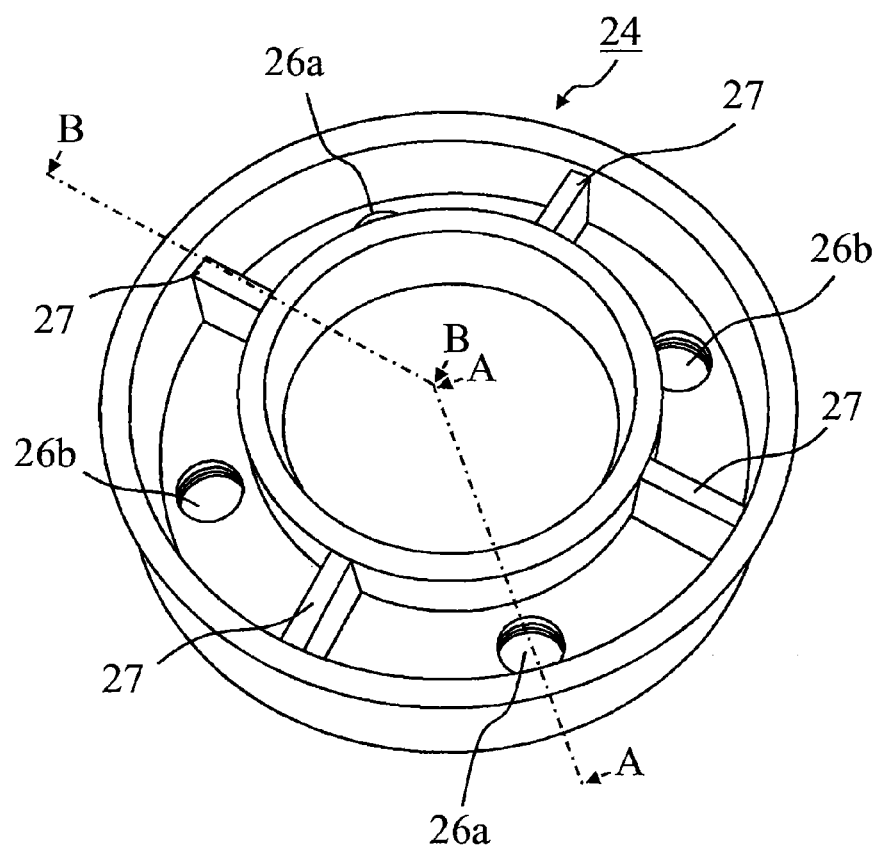
FIG. 4 is a perspective view of four separated diffusion chambers of the Hall thruster according to the first embodiment.

Here, in FIG. 3, with a border of a center line expressed by an alternate long and short dash line at the center of the Hall thruster 10, an upper half shows a cross section of a part where a port 26a exists along the line A-A of FIG. 4 (a cross section of a part where a port 26b exists should be the same), and a lower half shows a cross section of a part where the partitions 27 and 28 exist along the line B-B of FIG. 4.

In the experiment, since the measurement is done under the condition not to deflect the thrust vector, the propellant of the same mass flow rate is supplied to each pair of the ports 26a and 26b diagonally opposite from each other, and the ports 26a and 26b of FIG. 4 are controlled by two flow rate controllers (which adjusts the supplying amount of the propellant by controlling the flow rate adjusters, etc. discussed above). Therefore, the propellant injecting part 25 adjusts, with respect to the injecting amount of the propellant to all the ports 26a and 26b of the plenum chamber 24, the differential to the previously-described certain rate between the injecting amount of the propellant to the ports 26a arranged at the azimuthally first and third diffusion chambers and the injecting amount of the propellant to the ports 26b arranged at the azimuthally second and fourth diffusion chambers. This operation enables the distributor 37 to adjust, with respect to the propellant mass flow rate $m_{tot}$ in the discharge space 11 of the acceleration channel 12, the differential $m_{dif}$ to the previously-described certain rate between the propellant mass flow rate $m_A$ in the azimuthally first and third regions and the propellant mass flow rate $m_B$ in the azimuthally second and fourth regions. That is, the propellant, the injecting amount of which is adjusted as described above, is supplied from the plurality of holes 13 of the distributor 37 via the anode 14 to the discharge space 11 of the acceleration channel 12, thereby adjusting the differential $m_{dif}$ between the mass flow rate $m_A$ and the mass flow rate $m_B$ with respect to the mass flow rate $m_{tot}$ to the previously-described certain rate.

For the electron source, a hollow cathode HC252, a product of Veeco-Ion Tech, Inc., is used. For the operation gas, Xe gas is supplied at the mass flow rate of 0.27 mg/s.

In the following, the measurement system facility will be explained with reference to FIG. 5.

A cylindrical vacuum chamber 29 made of stainless steel having the diameter of 2.0 m (meter) and the length of 3.0 m is used. A vacuum exhaust system is composed of one oil diffusion pump (the exhaust velocity is 37000 L/s (liter per second)), one mechanical booster pump (the exhaust velocity is 10000 m³/h (cubic meter per hour)), and two rotary pumps (the exhaust velocity is 15000 L/min (liter per minute)). Through the experiment, the inner chamber pressure is kept to $5.1 \times 10^{-3}$ Pa (pascal) or less.

Figure 5:
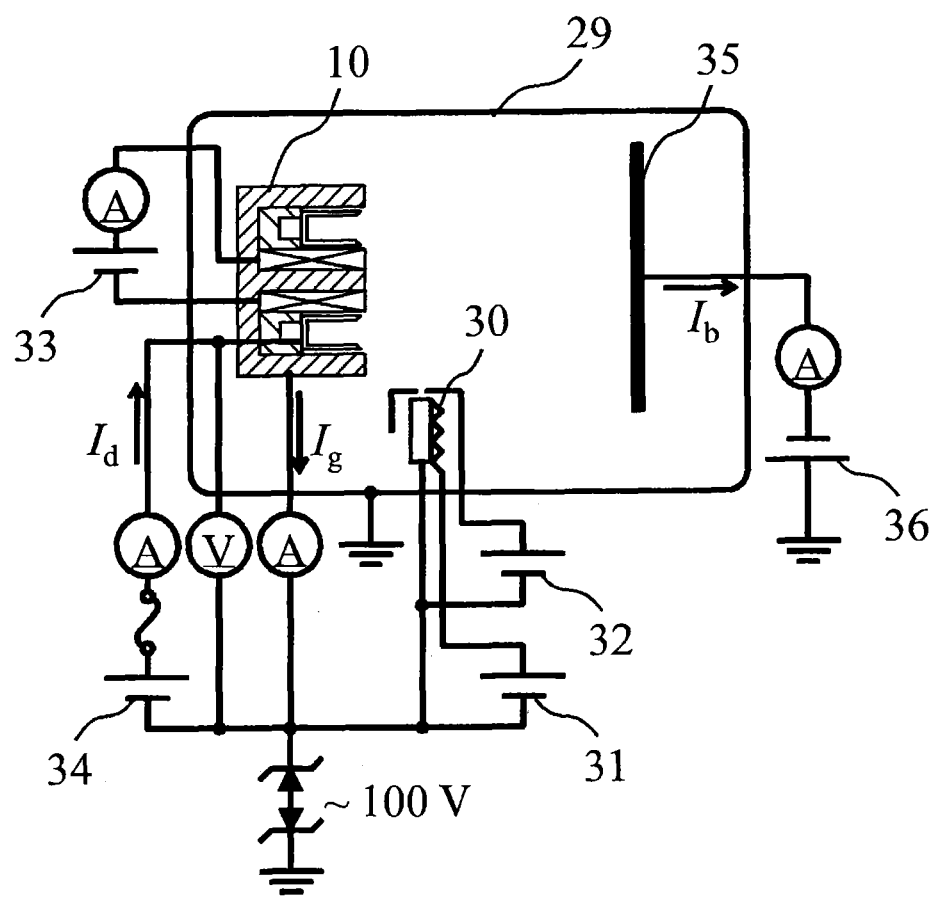
FIG. 5 is a schematic diagram of an electric circuit using the Hall thruster according to the first embodiment.

FIG. 5 shows a schematic diagram of an electric circuit. At the neighborhood of the ion output terminal of the Hall thruster 10, a cathode 30 for supplying an electron to the acceleration channel 12 of the Hall thruster 10 is provided. A heater power source 31 with voltage/current of 16V/10 A and a keeper power source 32 with voltage/current of 600V/2 A are connected to the cathode 30. The heater power source 31 is provided for heating the cathode 30. The keeper power source 32 is provided for stabilizing the electron flow from the cathode 30. A coil power source 33 with voltage/current of 16V/30 A is connected to the solenoidal coil 21 of the Hall thruster 10. A main discharge power source 34 with voltage/current of 400V/8 A is connected to the anode 14 of the Hall thruster 10. The discharge current $I_d$ is measured at between the anode 14 and the positive electrode of the main discharge power source 34 using an oscilloscope (the sampling rate is 20 MS/s (megasample per second), the frequency characteristic is 8 MHz (megahertz)). For measuring the beam current $I_b$, a copper ion collector 35 having the dimension of 500×500 mm, provided at around 250 mm downstream from the exit of the Hall thruster 10, is used. An ion collector power source 36 with voltage/current of 70V/5 A is connected to the ion collector 35. In order to avoid inflow of the electron, the ion collector 35 is kept to −20V with respect to the electric potential of the vacuum chamber 29. Further, the electric current $I_g$ flowing into the guard ring 15 of the Hall thruster 10 is measured at between the main body of the Hall thruster 10 and the negative electrode of the main discharge power source 34.

The thrust F is measured by using a dual pendulum thrust stand developed by University of Tokyo (refer to Non Patent Literature 16). The dual pendulum thrust stand includes an inner pendulum for mounting the Hall thruster 10 and sensor targets and an outer pendulum for mounting an LED (light-emitting diode) displacement sensor. The displacement between the two pendulums which receive approximately equal plume radiation heat is measured, thereby reducing the thermal drift errors of the measurement values. Further, in order to reduce variation of the thermal input to the outer pendulum caused by the displacement of the inner pendulum and the influence of non-linear behavior of the wiring/piping of the Hall thruster 10, a J×B controller composed of the inner pendulum and a chamber-fixing system controls the inter-pendulum displacement to be 0. The value of the electric current flowing to the J×B controller is controlled using LabVIEW (the registered trademark). The conversion coefficient of the control current and the thrust is calculated by the thrust calibration using four precision weights of 2 g (gram) (±5 mg (milligram)).

Hereinafter, the experiment will be summarized.

The total propellant mass flow rate $m_{tot}$ of the anode 14 and the discharge voltage $V_d$ are respectively fixed to 2.73 mg/s and 250 V, the normalized differential of the mass flow rate of $m_{dif}/m_{tot}$ $(=(m_A-m_B)/(m_A+m_B))$ is changed from 0.0 to 1.0, the discharge current $I_d$ and the thrust F are measured, and then the oscillation amplitude Δ and the thrust efficiency $\eta_t$ are calculated. Further, the beam current $I_b$ and the electric current $I_g$ flowing to the guard ring 15 are measured, and the electron current $I_e$ $(=I_d-I_b-I_g)$ is calculated.

Hereinafter, the experiment result will be explained.

First, the oscillation reduction effect will be explained.

Figure 6:
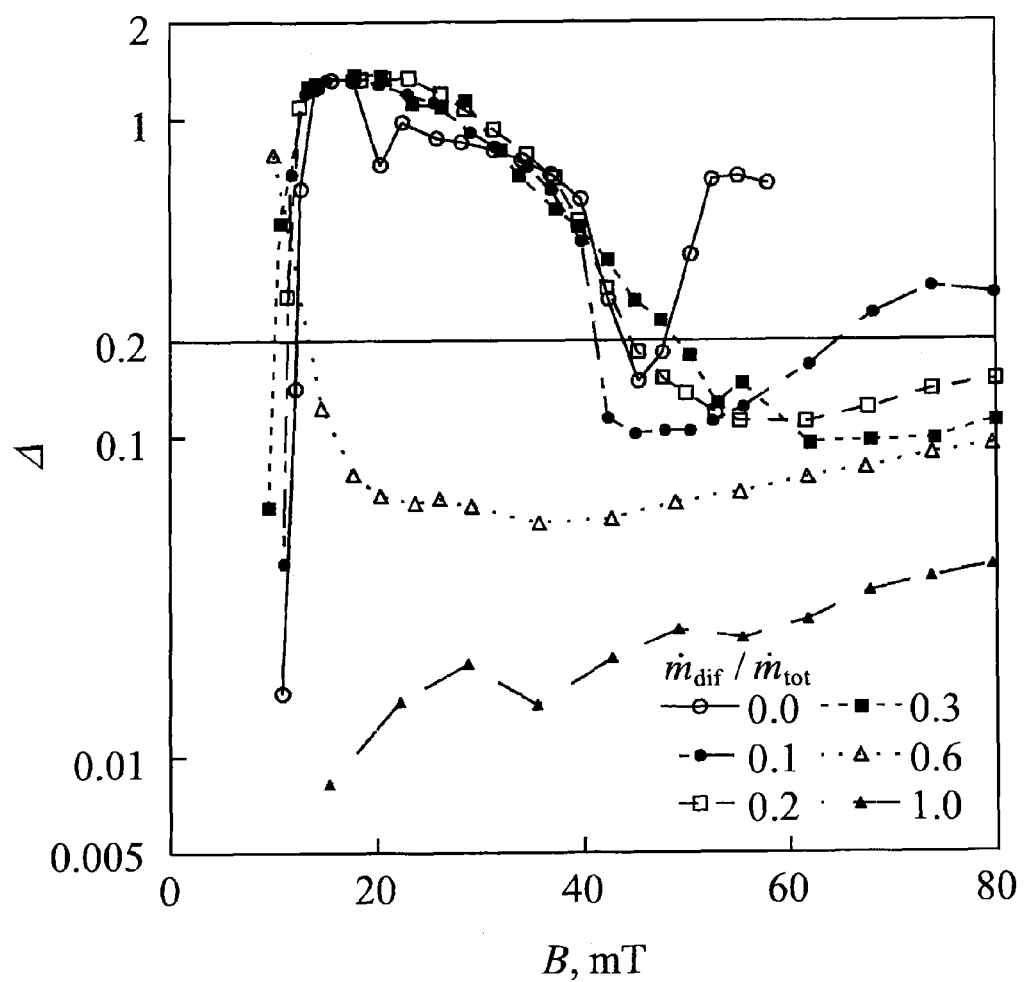
FIG. 6 is a graph showing oscillation amplitude $\Delta$ ($m_{tot}$=2.73 mg/s, $V_d$=250 V) of the Hall thruster according to the first embodiment.

Variation of the oscillation amplitude Δ with respect to $m_{dif}/m_{tot}$ is shown in FIG. 6. FIG. 6 is a graph showing variation of the oscillation amplitude Δ of the Hall thruster 10 with respect to the magnetic flux density B (unit: mT). As $m_{dif}/m_{tot}$ increases, the oscillation decreases from the side of the high magnetic field. In the range where $m_{dif}/m_{tot}$ is small such as $m_{dif}/m_{tot} \leq 0.3$, the oscillation amplitude Δ of the high magnetic field largely decreases, the region where Δ<0.2 is satisfied expands towards the side of the high magnetic field. When $m_{dif}/m_{tot}$ increases more, the region with small-amplitude oscillation expands towards the side of the low magnetic field, and when $m_{dif}/m_{tot}=1.0$, Δ<0.2 is satisfied in the entire magnetic flux density region.

In the following, the thrust efficiency will be explained.

Figure 7:
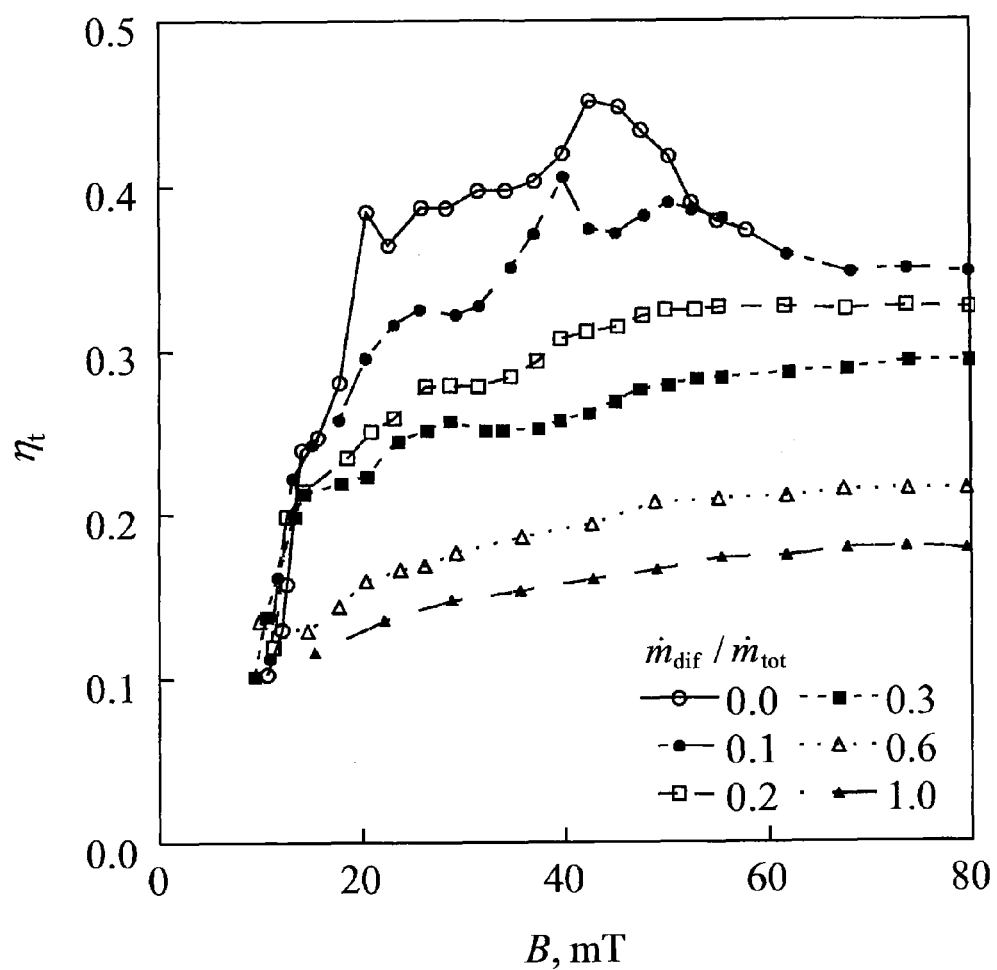
FIG. 7 is a graph showing thrust efficiency $\eta_t$ ($m_{tot}$2.73 mg/s, $V_d$=250 V) of the Hall thruster according to the first embodiment.
Figure 8:
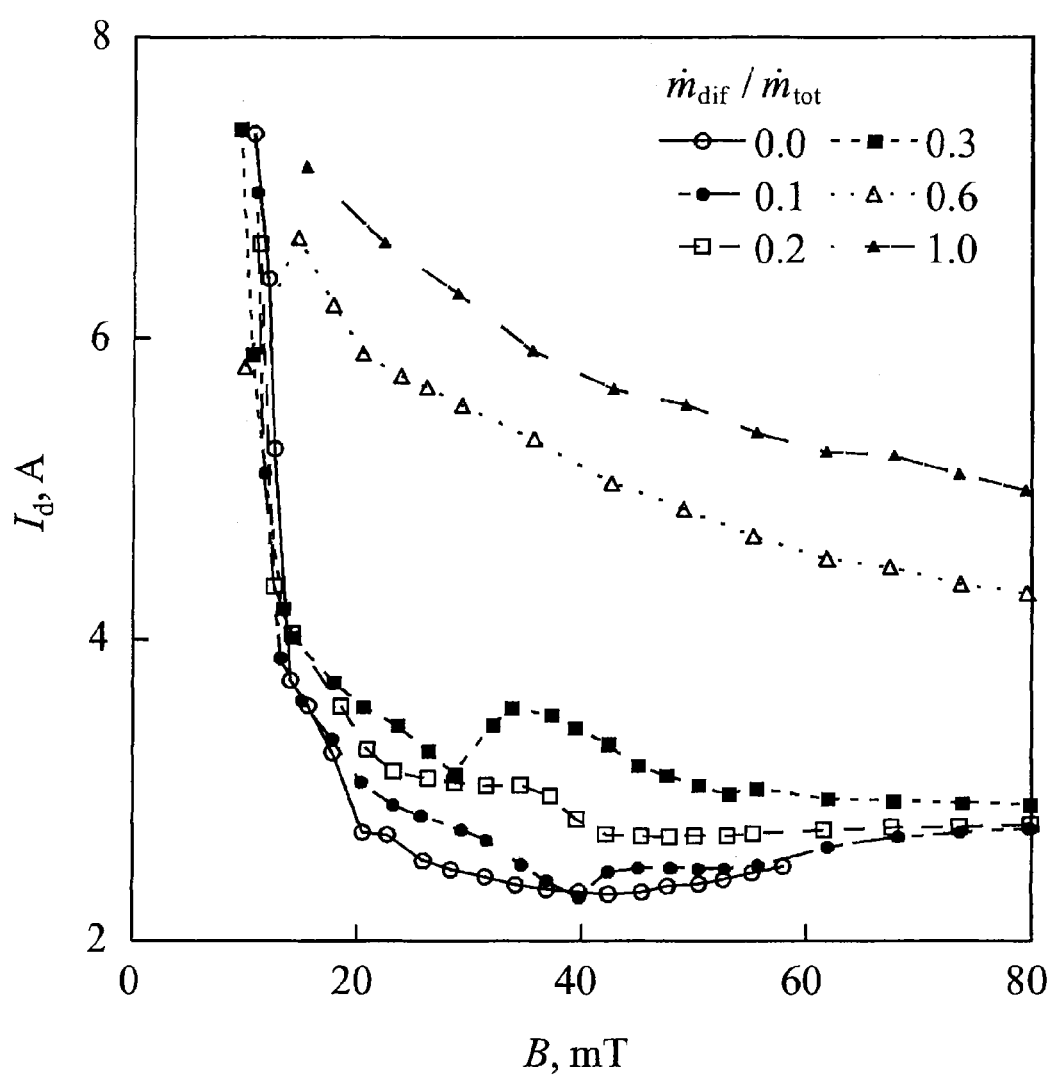
FIG. 8 is a graph showing discharge current $I_d$ ($m_{tot}$=2.73 mg/s, $V_d$=250 V) of the Hall thruster according to the first embodiment.
Figure 9:
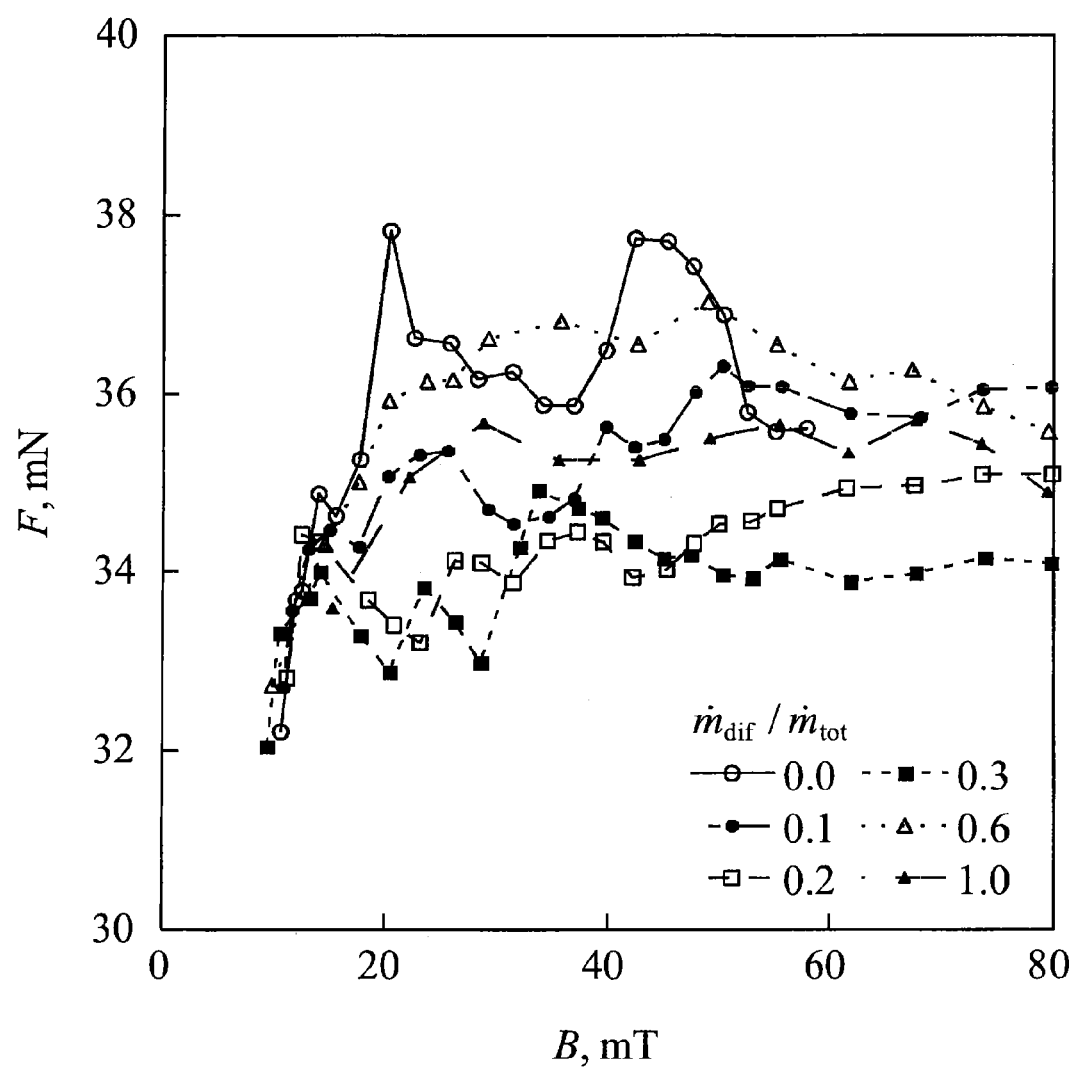
FIG. 9 is a graph showing thrust F ($m_{tot}$=2.73 mg/s, $V_d$=250 V) of the Hall thruster according to the first embodiment.

FIG. 7 shows variation of the thrust efficiency $\eta_t$ with respect to $m_{dif}/m_{tot}$. FIG. 7 is a graph showing variation of the thrust efficiency $\eta_t$ of the Hall thruster 10 with respect to the magnetic flux density B (unit: mT). The thrust efficiency $\eta_t$ decreases as $m_{dif}/m_{tot}$ decreases. In case of $m_{dif}/m_{tot}=1.0$ where the remarkable oscillation reduction effect can be obtained such that Δ<0.2 is satisfied in the entire magnetic flux density region, the maximum thrust efficiency $\eta_t$ becomes 0.18; that is, the oscillation reduction effect largely decreases compared with the maximum thrust efficiency $\eta_t=0.45$ in case of $m_{dif}/m_{tot}=0.0$ where Δ<0.2 is satisfied. FIGS. 8 and 9 show variation of the discharge current $I_d$ and the thrust F with respect to $m_{dif}/m_{tot}$. FIG. 8 is a graph showing variation of the discharge current $I_d$ (unit: A) of the Hall thruster 10 with respect to the magnetic flux density B (unit: mT). FIG. 9 is a graph showing variation of the thrust F (unit: mN) of the Hall thruster 10 with respect to the magnetic flux density B (unit: mT). The discharge current $I_d$ largely increases as $m_{dif}/m_{tot}$ increases; however, the thrust F does not largely vary. The decrease of the thrust efficiency $\eta_t$ is mainly caused by the increase of the power consumption due to the increase of the discharge current $I_d$.

Figure 10:
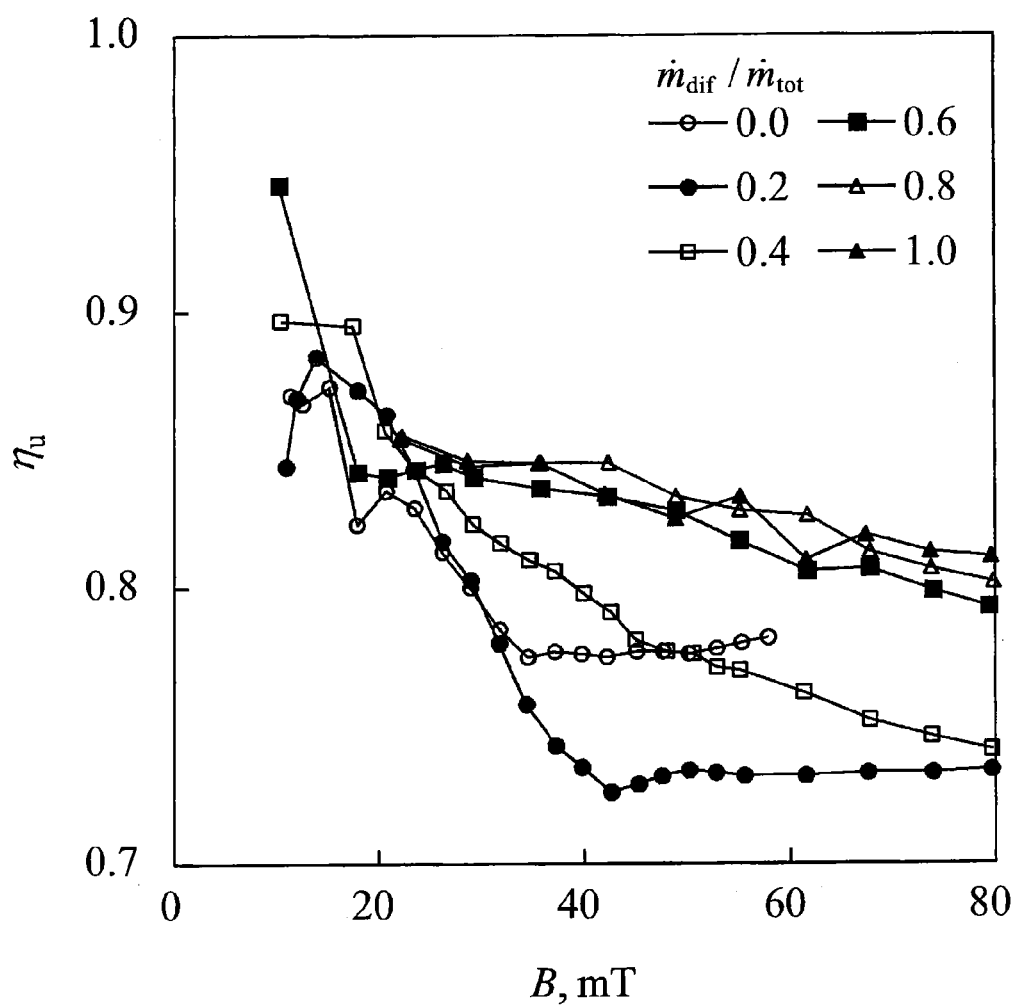
FIG. 10 is a graph showing propellant use efficiency $\eta_u$ ($m_{tot}$=2.73 mg/s, $V_d$=250 V) of the Hall thruster according to the first embodiment.
Figure 11:
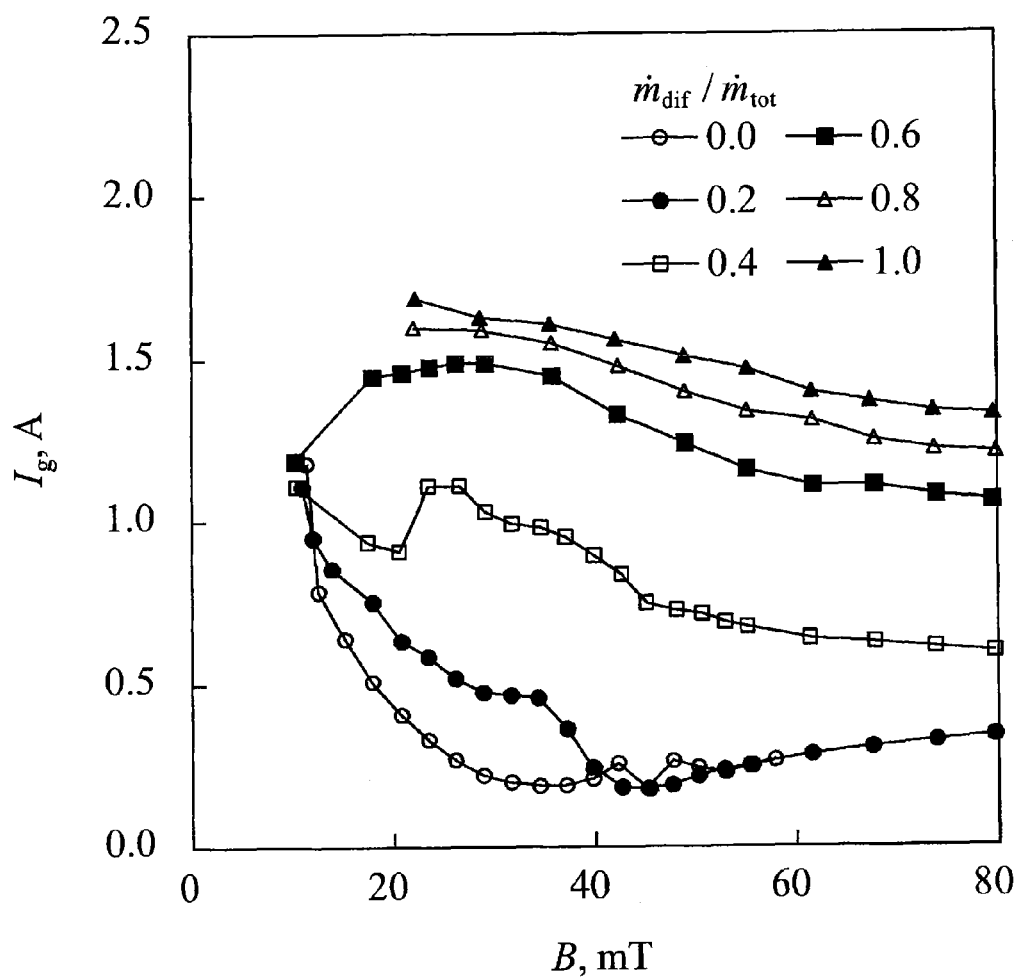
FIG. 11 is a graph showing guard ring current $I_g$ ($m_{tot}$=2.73 mg/s, $V_d$=250 V) of the Hall thruster according to the first embodiment.

FIG. 10 is a graph showing variation of the propellant use efficiency $\eta_u$ of the Hall thruster 10 with respect to the magnetic flux density B (unit: mT). FIG. 11 is a graph showing variation of the electric current $I_g$ (unit: A) flowing to the guard ring 15 of the Hall thruster 10 with respect to the magnetic flux density B (unit: mT). As shown in FIG. 10, the propellant use efficiency $\eta_u$ tends to increase more or less as $m_{dif}/m_{tot}$ increases. It is considered since electron-neutral collision frequency $v_{en}$ between the propellant and the electron is proportional to the electron number density $n_n$ and the neutral particle number density $n_e$, the propellant use efficiency $\eta_{u,A}$ in the high density region increases, on the other hand, propellant use efficiency $\eta_{u,B}$ in the low density region decreases, and the propellant use efficiency $\eta_u$ increases as an average. On the other hand, as shown in FIG. 11, the increase of $m_{dif}/m_{tot}$ causes to increase the loss of ions to the guard ring 15. It is considered since the increase of the amount of ionization increases the ion number density of the Hall thruster 10, and the ions which are ionized due to the existence of azimuthal direction electric field $E_\theta$ flow in the azimuthal direction. After reunion due to the collision with the guard ring 15, the ions are re-ionized in the low electric potential region at more downstream, the energy efficiency, etc. is reduced, and the effect of the increase of the propellant use efficiency $\eta_n$ is cancelled, thereby causing no change in the thrust F.

Figure 12:
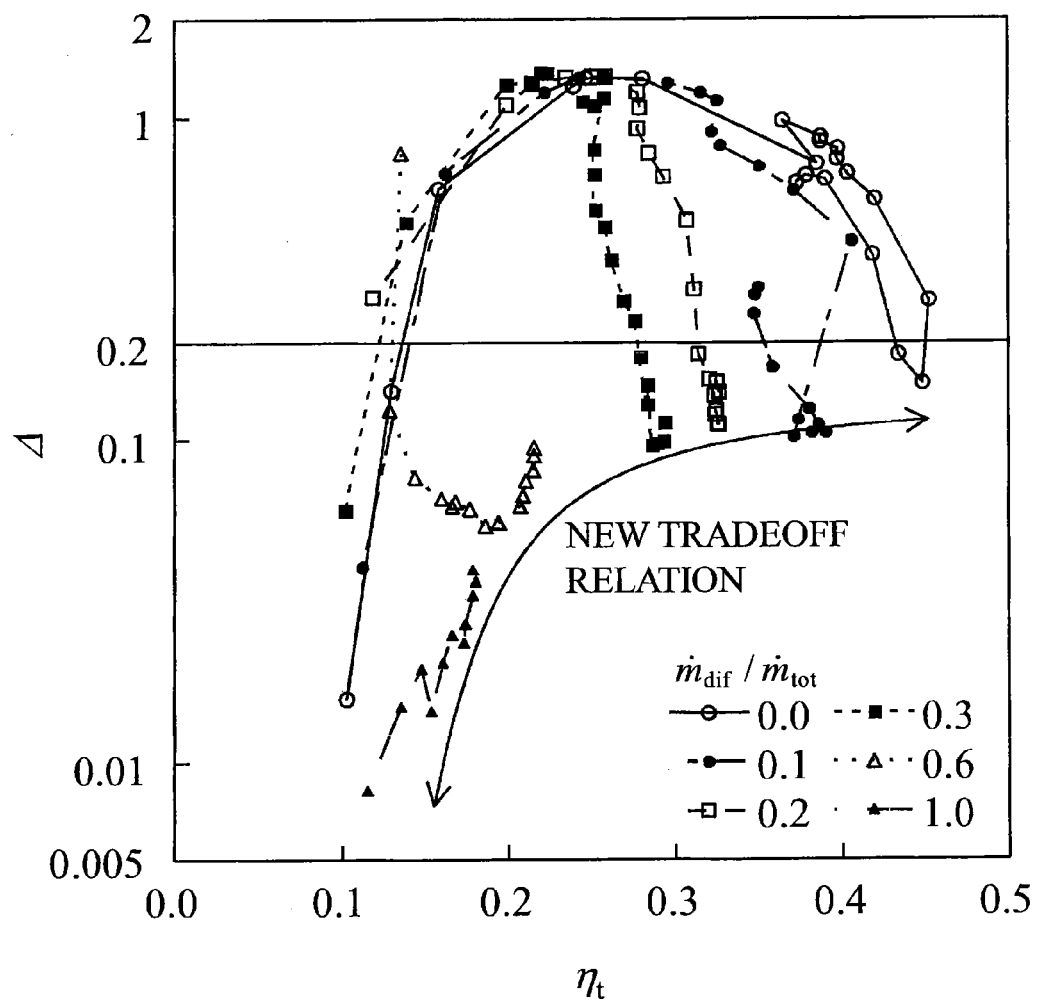
FIG. 12 is a graph showing relation ($m_{tot}$=2.73 mg/s, $V_d$=250 V) between thrust efficiency $\eta_t$ and oscillation amplitude $\Delta$ of the Hall thruster according to the first embodiment.

As discussed above, in the present embodiment, the oscillation reduction effect can be obtained in exchange for the decrease of the thrust efficiency $\eta_t$. FIG. 12 summarizes the relation between the thrust efficiency $\eta_t$ and the oscillation amplitude Δ. FIG. 12 is a graph showing the relation between the thrust efficiency $\eta_t$ and the oscillation amplitude Δ of the Hall thruster 10. The relation between the thrust efficiency $\eta_t$ and the oscillation amplitude A of the conventional thruster is expressed by the line of $m_{dif}/m_{tot}=0.0$; on the other hand, in the present embodiment where the new parameter $m_{dif}/m_{tot}$ is introduced, as shown in the solid line with double arrow, the tradeoff can shift to the region with small-amplitude oscillation. That is, it is possible to select an operating point with small-amplitude oscillation with respect to the same thrust efficiency $\eta_t$. FIG. 13 shows the performance at the maximum efficiency point that satisfies Δ<0.2, and the magnetic flux density width of the region of Δ<0.2 including the point, in each differential of the mass flow rate where $m_{dif}/m_{tot} \leq 0.2$. It is understood that the region width of Δ<0.2 is also expanded by the tradeoff with the thrust efficiency $\eta_t$. In case of $m_{dif}/m_{tot}=0.0$, the width of operation region in which Δ<0.2 is satisfied is 44 to 48 mT; however, in case of $m_{dif}/m_{tot}=0.1$, the width of operation region largely expands to 42 to 64 mT.

In the following, the performance will be compared.

FIG. 14 shows the performance of typical thrusters. Numbers of the thruster name show the outer diameter of the channel in the magnetic layer type (M), and the average diameter of the channel in the anode layer type (A). The unit is mm. When comparing the performance obtained by the present embodiment and the performance of the typical magnetic layer type, the performance when $m_{dif}/m_{tot}=0.1$ (refer to FIG. 13) is found to be substantially the same performance as the magnetic layer type with the same size as the used Hall thruster 10 (the outer diameter of the channel is 62 mm). That is, when the region with small-amplitude oscillation is expanded to 42 to 64 mT using the present embodiment, the thrust efficiency $\eta_t$ becomes low as the anode layer type; however, the thrust efficiency $\eta_t$ being substantially the same as the magnetic layer type can be maintained. This suggests the possibility to utilize the feature of the anode layer type such that the wall erosion is small and implement a long-life Hall thruster by using the present embodiment. Further, in case of the anode layer type D-55 having the same average diameter of the channel as the used Hall thruster 10, $\eta_t$ 0.60 is achieved when $m_{dif}/m_{tot}=0.0$. This is 0.15 higher than the maximum $\eta_t=0.45$ when $m_{dif}/m_{tot}=0.0$ in the experiment, and suggests the possibility to achieve the thrust efficiency $\eta_t$ higher than 0.39 when $m_{dif}/m_{tot}=0.1$ by further improvement.

In the following, electron current will be explained.

Figure 15:
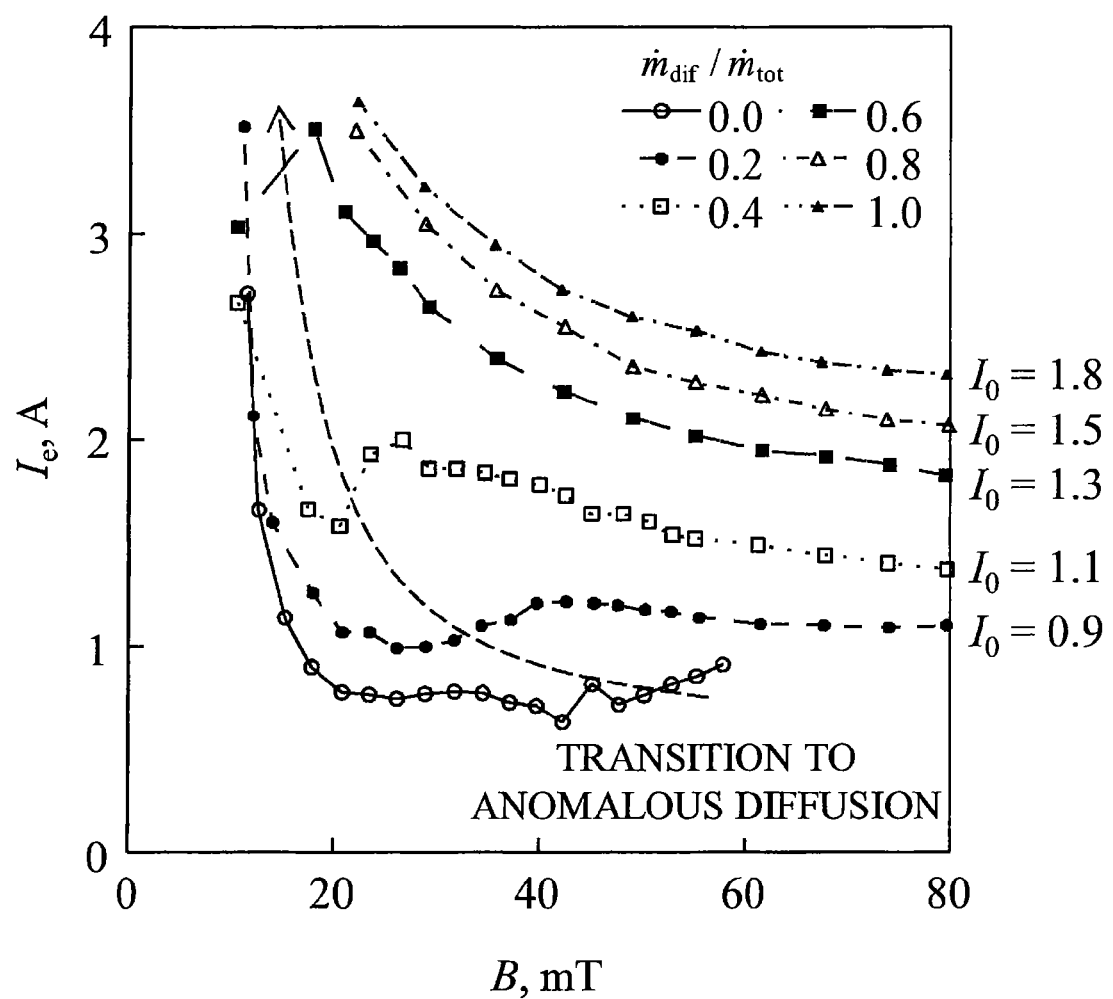
FIG. 15 is a graph showing electron current $I_e$ ($m_{tot}$=2.73 mg/s, $V_d$=250 V) of the Hall thruster according to the first embodiment.

FIG. 15 shows variation of the electron current $I_e$ flowing to the acceleration channel 12 with respect to $m_{dif}/m_{tot}$. The electron current $I_e$ flowing to the acceleration channel 12 largely increases with $m_{dif}/m_{tot}$, which can be said to be the cause of the previously-described increase of the discharge current $I_d$. The increase of the electron current $I_e$ appears to be caused by the following two factors.

The first factor is the expansion of the low magnetic field in the anomalous diffusion region. As shown in FIG. 11, the transition point shifts to the low magnetic field side as $m_{dif}/m_{tot}$ increases. It is observed the transition point at which point from the classical diffusion where the axial direction transition of electron is proportional to $1/B^2$ to the anomalous diffusion (refer to Non Patent Literatures 7, 20, and 21) where the axial direction transition of electron is proportional to $1/B$ is shifted to the low magnetic field side as $m_{dif}/m_{tot}$ increases; it is considered that this increases the electron current $I_e$ of the classical diffusion region. In the anode layer type where the interaction between wall surface and electron is negligible, the anomalous diffusion is considered to be caused by the density fluctuation in the azimuthal direction of 1 to 100 MHz. It is considered that, since the present embodiment generates a stationary azimuthal density differential, the fluctuation is easily induced in the low magnetic field.

Figure 16:
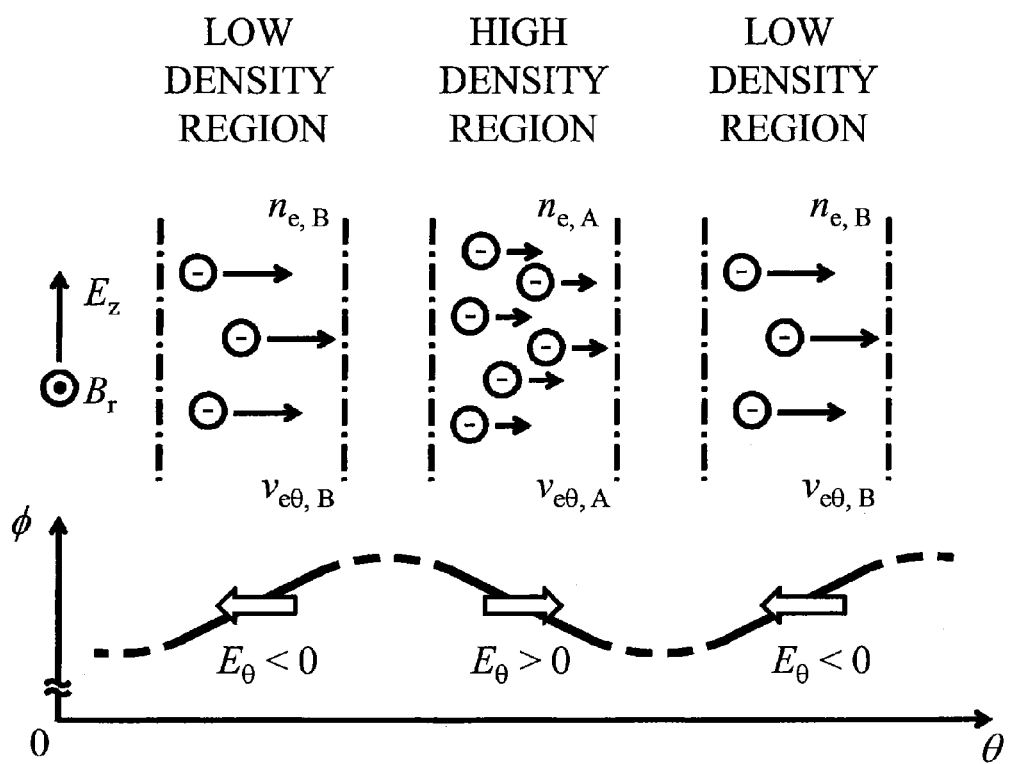
FIG. 16 is a schematic view of potential gradient caused by azimuthal density differential of the Hall thruster according to the first embodiment.

The second factor is the increase of the offset electron current $I_0$ which is independent of the magnetic flux density B. FIG. 15 is a graph showing variation of the electron current $I_e$ flowing to the acceleration channel 12 of the Hall thruster 10 with respect to the magnetic flux density B (unit: mT). The offset electron current $I_0$ shown in FIG. 15 is a value of electron current $I_e$ of the anomalous diffusion region fitted with $c/B+I_0$ (c denotes a coefficient which is independent of the magnetic flux density), which shows the offset electron current $I_0$ largely increases with $m_{dif}/m_{tot}$. The increase of the offset electron current $I_0$ can be explained as follows (refer to Non Patent Literature 22). As shown in FIG. 16, it is considered of a case in which there exist regions having different density in the azimuthal direction. In the Hall thruster 10, due to the axial direction electric field $E_z$ and the radial direction magnetic field $B_r$ which are orthogonal, the electron is E×B drifted in the $+\theta$ direction, thereby generating the Hall current. Because the Hall current density is much larger than the electron current density in the axial direction, the electron velocity in the azimuthal direction must satisfy $v_{e\theta,A} < v_{e\theta,B}$ in case of $n_{e,A} > n_{e,B}$. Here, the electron velocity $v_{e\theta}$ in the azimuthal direction is given by the following equation.

[Equation 3]

$$v_{e\theta} = -\frac{m_e v_{en}}{eB^2}\left[E_\theta + \frac{\frac{\partial}{r\partial\theta}(n_e k_B T_e)}{en_e}\right] + \frac{1}{B}\left[E_z + \frac{\frac{\partial}{\partial z}(n_e k_B T_e)}{en_e}\right] \quad (3)$$

FIG. 16 shows a schematic view of a potential gradient caused by the azimuthal density differential in the Hall thruster 10. The third and fourth terms in the equation (3) represent normal Hall current in $+\theta$ direction. It is considered that in order to satisfy $v_{e\theta,A} < v_{e\theta,B}$, the azimuthal potential differential occurs as shown in FIG. 16, thereby inducing the electric field $E_\theta$ of the $+\theta$ direction in the high density region and the electric field $E_\theta$ of the $-\theta$ direction in the low density region. The azimuthal electric field $E_\theta$, by E×B drift with an orthogonal radial direction magnetic field $B_r$, increases the axial flow velocity of electrons in the high density region, and decreases it in the low density region. As a result, the electron current $I_e$ which is the integral of the flux in the azimuthal direction increases. Here, since the increase of $m_{dif}/m_{tot}$ also increases $v_{e\theta,A}/v_{e\theta,B}$, the azimuthal electric field $E_\theta$ increases with $m_{dif}/m_{tot}$. Further, because the coefficient of the first and second terms, and the coefficient of the third and fourth terms of the equation (3) are proportional to $1/B^2$ and $1/B$, respectively, the azimuthal electric field $E_\theta$ increases almost proportionally to the magnetic flux density B. The variation of the electron velocity in the electron-axial direction by the azimuthal electric field $E_\theta$ is represented as $E_\theta/B$, and thus the increase of the electron current $I_e$ is induced as a term $I_0$ which is independent of the magnetic flux density.

Figure 17:
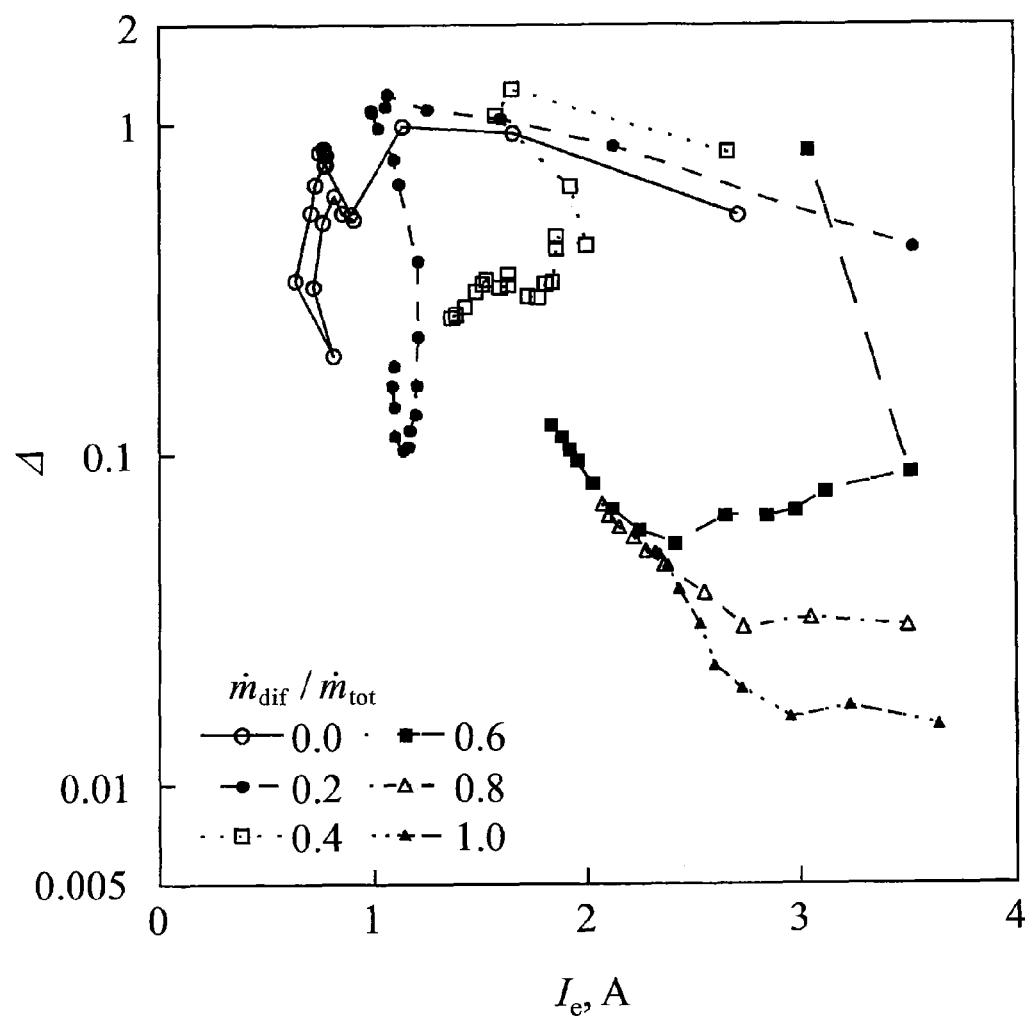
FIG. 17 is a graph showing relation ($m_{tot}$=2.73 mg/s, $V_d$=250 V) between electron current $I_e$ and oscillation amplitude A of the Hall thruster according to the first embodiment.

Because of the above two factors, the mass flow rate differential in the azimuthal direction increases the electron current $I_e$ and decreases the thrust efficiency $\eta_t$. However, the expansion of the anomalous diffusion region is almost coincident with the expansion of the region with small-amplitude oscillation, and from FIG. 17 which shows the relation between the electron current $I_e$ (unit: A) flowing to the acceleration channel 12 of the Hall thruster 10 and the oscillation amplitude $\Delta$, the increase of the electron current $I_e$ appears to associate with the decrease of the oscillation amplitude $\Delta$, and thus it is considered that the increase of the electron current $I_e$ appears to contribute the oscillation reduction (refer to Non Patent Literature 7). Further, from FIG. 17, even if the electron current $I_e$ is the same, the more increase of $m_{dif}/m_{tot}$ and transition to the anomalous diffusion occur, the smaller the oscillation amplitude $\Delta$ is (refer to Non Patent Literature 9).

In the present embodiment, it is considered that a great effect of the oscillation reduction can be obtained in exchange for a slight decrease of the thrust efficiency $\eta_t$ because the anomalous diffusion region, in which the tradeoff relation between the electron current $I_e$ and the oscillation amplitude $\Delta$ is improved, expands.

As has been explained, in the experiment, as a new method to reduce the discharge current oscillation, the propellant is supplied to the acceleration channel 12 at a azimuthally non-uniform mass flow rate, resulting in the following.

1. With the increase of the mass flow rate differential in the azimuthal direction, the oscillation is largely reduced from the high magnetic field side.
2. Although the increase of the electron current $I_e$ decreases the maximum thrust efficiency $\eta_t$, it is possible to maintain the thrust efficiency 39% which is substantially the same level as the magnetic layer type with approximately the same channel diameter, and achieve the operation which satisfies $\Delta<0.2$ in a wide range of 42 to 64 mT.

From these results, it can be said that a method (a propulsion method) to largely expand the operation region with small-amplitude oscillation is obtained in exchange for the slight decrease of the thrust efficiency. Further, it is expected to achieve the efficiency exceeding 39%, which is obtained at this time, by the optimization of the channel shape, etc. It is expected that the present embodiment will largely contribute the practical use of the anode layer type. That is, by mounting the Hall thruster 10 according to the present embodiment on a cosmonautic vehicle such as a satellite, a spacecraft, etc., the cosmonautic vehicle which implements a small/light-weight thrusting system can be provided.

From the results of the above experiment, it is considered that, when $0.05 \leq m_{dif}/m_{tot} \leq 0.15$, an effect to reduce the discharge current oscillation of the Hall thruster 10 in the width of operation parameter region sufficiently wide for a practical use is achieved. In particular, as can be understood from FIGS. 12 and 13, when $m_{dif}/m_{tot}=0.1$, an effect to reduce the discharge current oscillation of the Hall thruster 10 in the width of operation parameter region, the width being wide, such as 42 to 64 mT, and further, to maintain a sufficient thrust efficiency $\eta_t$. Therefore, with respect to the propellant mass flow rate $m_{tot}$ in the discharge space 11 of the acceleration channel 12, it is preferable to adjust the differential $m_{dif}$ within a range of 5 to 15%, the most preferably 10% between the propellant mass flow rate $m_A$ in a region with a large mass flow rate of the propellant and the propellant mass flow rate $m_B$ in a region with a small mass flow rate of the propellant.

As has been explained, in the present embodiment, the circumferential density distribution of the propellant gas in the acceleration channel 12 of the Hall thruster 10 is made non-uniform, thereby suppressing the discharge oscillation as a whole. Because of this, it is possible to obtain the effect to ensure the stable operation and the long life of the Hall thruster 10. Even if the Hall thruster 10 is the magnetic layer type, it is also possible to obtain the effect to reduce the discharge current oscillation of the Hall thruster 10 as well as the present embodiment. Therefore, the present embodiment is applicable to both of the anode layer type and the magnetic layer type.

Specifically, in the present embodiment, the acceleration channel 12 is equally divided into four in the azimuthal direction; the propellant gas flow rate is made to have a differential of 5 to 15% between the first and third region and the second and fourth region. As a method to make neutral particle density in the acceleration channel 12 azimuthally non-uniform, a method to divide the plenum chamber 24 into four diffusion chambers and adjust the supplying amount of the propellant to each diffusion chamber is used. Here, the number of regions obtained by division should be two or more, and the mass flow rate differential of the propellant gas between the adjacent regions should be 5 to 15%.

Hereinafter, the mechanism of the discharge oscillation generation in the conventional Hall thruster will be explained.

The mechanism of the discharge oscillation of 10 to 100 kHz is called as "ionization oscillation", which exists in various plasma phenomena/devices. Since the velocity of the propellant particle flowing into the ionization zone is largely different from the velocity of the ions flowing out from the ionization zone, the oscillation phenomena associated with the depletion phenomena of the propellant particle may occur, depending on the relationship between the mass flow rate and the ionization rate.

Hereinafter, the stabilization mechanism within a range of narrow magnetic flux density B will be explained.

The discharge oscillation mechanism is, since the ionization zone reciprocates in the thrust axial direction, also called as a breath mode vibration, and can be expressed by the one-dimensional flow model in the axial direction. Nonlinear dispersive equations obtained using the one-dimensional flow model is analyzed to obtain condition under which no oscillation may occur in any frequency (i.e., imaginary components of the complex oscillation frequency becomes negative), thereby reproducing the measurement results as shown in FIG. 1. As discussed above, the oscillation of the discharge current $I_d$ is suppressed to no more than 20% in the regions (I) and (III) of FIG. 1. Since the discharge current $I_d$ is too large and the thrust efficiency $\eta_t$ is low in the region (I), it is preferable to operate the Hall thruster in the region (III).

The stabilization condition of the model shown in Non Patent Literature 7 is as follows.

[Equation 4]

$$S_1 V_{e1} - S_0 V_{e0} > \overline{\gamma N_n} SL \qquad (4)$$

In the equation (4), L shows the ionization zone length, $V_e$ shows the electron velocity, N shows the number density, S shows a cross section area of the channel, and γ shows an ionization rate. The suffix 0 indicates an entrance side of the propellant and 1 indicates an exit side of the propellant in the channel.

The discharge stability is a function of the electron mobility (velocity) and the ionization rate, and the equation (4) shows under the condition where "the electron velocity towards the anode" exceeds "the average electron production rate in the ionization zone", the oscillation in any frequency will be attenuated.

Hereinafter, according to the present embodiment, the mechanism to expand the magnetic flux density range for the stable operation will be explained.

Although a discharge stabilizing method such as changing a channel width to the thrust axial direction, etc. has been proposed, it has been difficult to expand the stable operation region as long as it is considered one-dimensionally in the axial direction. The essence of the present embodiment is focused on the distribution in the circumferential direction, by changing the way of thinking.

When high/low density of the propellant in the circumferential direction is given, the condition of the equation (4) will be satisfied somewhere. At that point, the oscillation in any frequency will be attenuated, and further the ionization oscillation around that point is also attenuated dissipatively and viscously, thereby generally inducing or maintaining no remarkable frequency oscillation. Even if the magnetic flux density B or the operation condition is changed, the oscillation attenuation region exists at some point in the circumferential direction, and thus the discharge current oscillation can be suppressed.

Hereinafter, the mechanism to establish both high efficiency and stable discharge will be explained.

When the density gradient exists in the azimuthal direction, the electron mobility in the axial direction is increased, resulting in the increase of the discharge current $I_d$. Here, the relation between the density disturbance in the azimuthal direction and the anomalous diffusion of electron has been already clarified by the numerical computation, etc. Assuming "since the discharge oscillation is suppressed by the increase of the discharge current $I_d$ (the electron mobility), the thrust efficiency $\eta_t$ and the discharge stability have tradeoff relationship", it is a less attractive discharge stabilizing method to make the circumferential density distribution of the propellant gas non-uniform in the acceleration channel 12 of the Hall thruster 10. In the present embodiment, however, with the condition of small mass flow rate differential, it is found by the experiment that the discharge oscillation can be controlled while the variation of the electron mobility is small, thereby implementing a highly efficient and stable discharge. That is, the present embodiment is based on the experimental proof that "the discharge oscillation is not suppressed by the increase of the electron mobility".

Here, the Hall thruster 10 used in the experiment is configured to have four regions as the plurality of regions, between adjacent ones of which the mass flow rate of the propellant is different, azimuthally in the discharge space 11 of the acceleration channel 12, but may be configured to have a different number of regions than four. In order not to deflect the thrust vector, it is preferable that the plurality of regions should be 2n (n is an integer being n≥2) regions. In this case, the distributor 37 adjusts, with respect to the propellant mass flow rate $m_{tot}$ in the discharge space 11 of the acceleration channel 12, the differential $m_{dif}$ to the previously-described certain rate between the propellant mass flow rate $m_A$ (or $m_B$) in the azimuthally odd-numbered regions and the propellant mass flow rate $m_B$ (or $m_A$) in the azimuthally even-numbered regions. Hereinafter, an example of a configuration for its implementation will be explained.

The plenum chamber 24 is divided into 2n sections which azimuthally correspond to the 2n regions, respectively. Therefore, 2n diffusion chambers similar to those shown in FIG. 4 are provided inside the plenum chamber 24. Here, it is preferable that the plenum chamber 24 should be equally divided by partitions similar to those shown in FIG. 4, or the like, in the azimuthal direction. The plenum chamber 24 has ports to which the propellant is injected, for example, one for each diffusion chamber. The propellant is injected to each port of the plenum chamber 24 after the injecting amount thereof is adjusted for each diffusion chamber by the propellant injecting part 25. During that time, the propellant injecting part 25 adjusts, with respect to the injecting amount of the propellant to all the 2n ports of the plenum chamber 24, the differential to the previously-described certain rate between the injecting amount of the propellant to the ports arranged at the azimuthally odd-numbered diffusion chambers and the injecting amount of the propellant to the ports arranged at the azimuthally even-numbered diffusion chambers. The propellant injected to each port of the plenum chamber 24 for each diffusion chamber is supplied from, among the plurality of holes 13, each hole 13 penetrating to the region corresponding to each diffusion chamber through the anode 14, to the discharge space 11 of the acceleration channel 12 by the distributor 37. For instance, in the distributor 37, 2n holes 13 are formed by 2n partitions, etc.; these holes 13 are equally arranged in the azimuthal direction.

It is considered that, by the above configuration, an effect to reduce the discharge current oscillation of the Hall thruster 10 in the width of operation parameter region sufficiently wide for a practical use is also achieved.

Embodiment 2.

Figure 18:
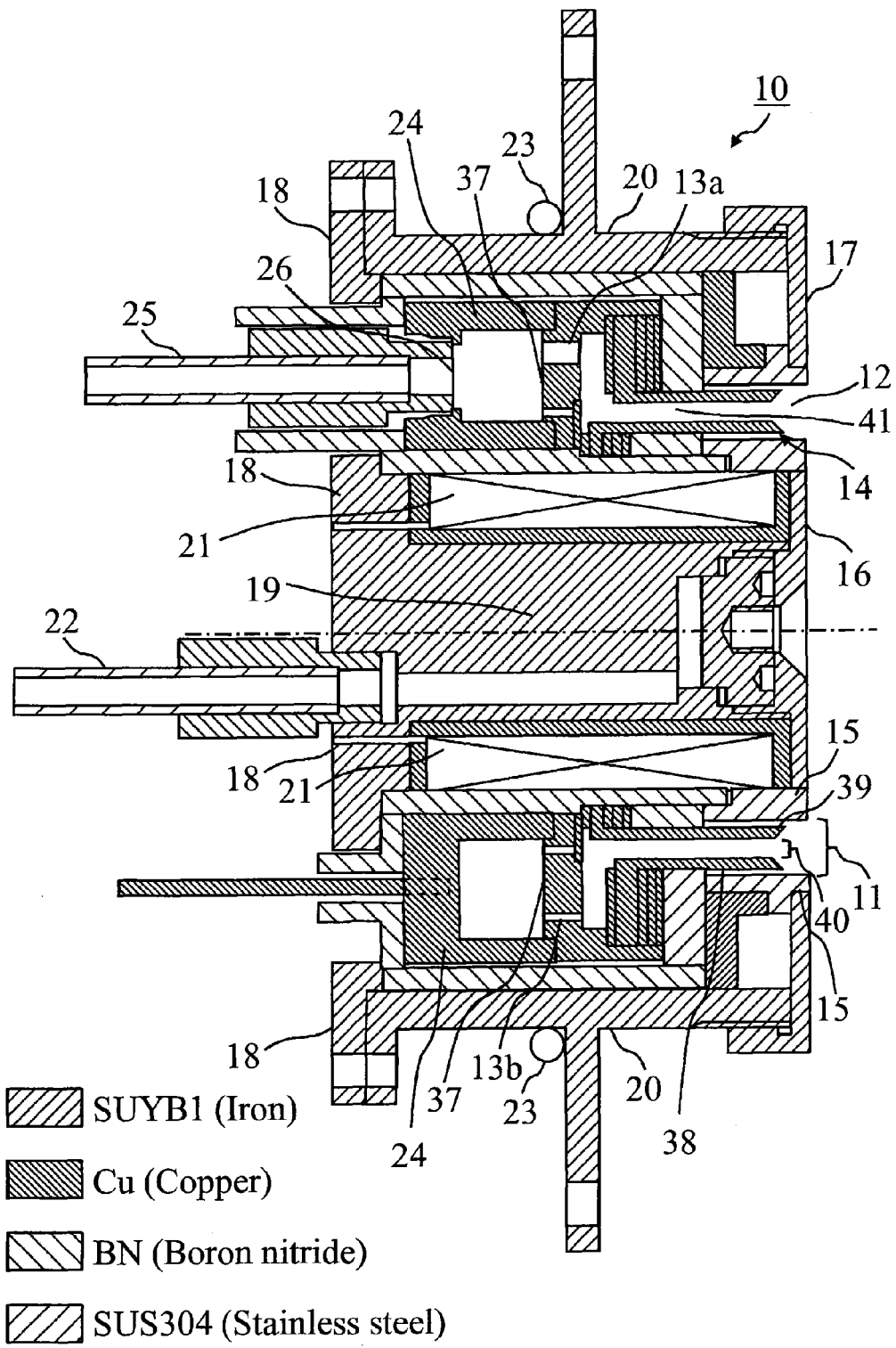
FIG. 18 is a cross sectional view of a Hall thruster according to the second embodiment.
Figure 19:
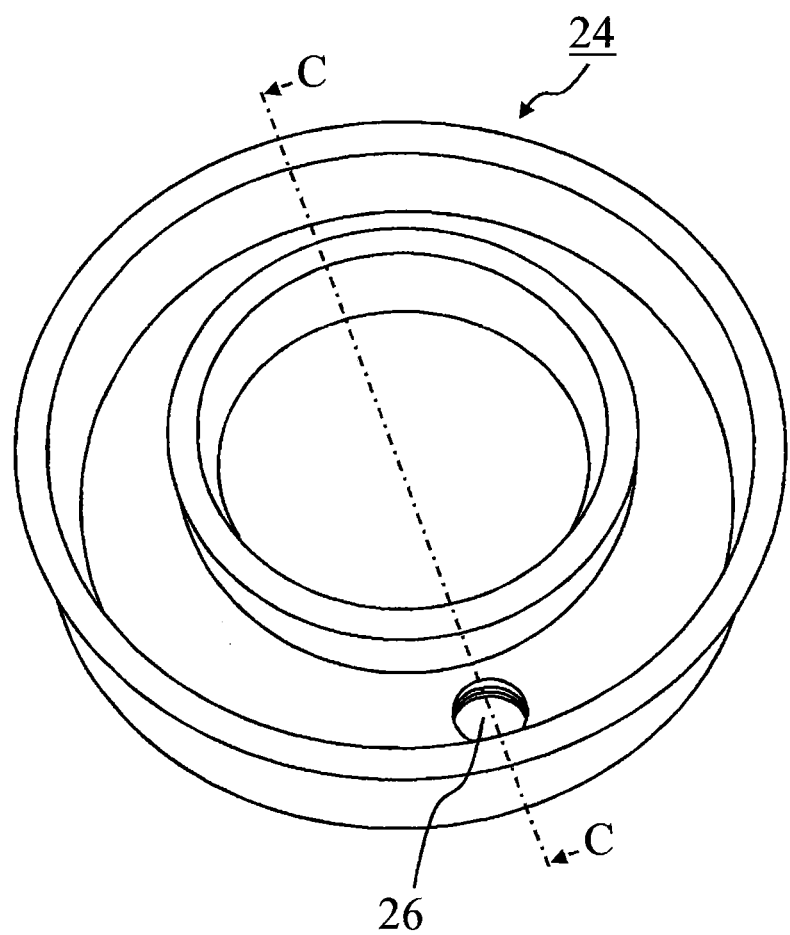
FIG. 19 is a perspective view of a diffusion chamber of the Hall thruster according to the second embodiment.

With reference to FIGS. 18 and 19, the present embodiment will be explained, focusing on the difference from the first embodiment.

In the first embodiment, the propellant, the mass flow rate of which is adjusted by the flow rate controller, is supplied from the holes 13 of the distributor 37; however, the mass flow rate of the propellant can be adjusted by the distributor 37 itself, not by the flow rate controller. In the present embodiment, the distributor 37 is provided with holes 13 having different conductance so that the mass flow rate of the propellant is adjusted by the distributor 37 itself.

FIG. 18 shows a cross sectional view of the anode layer type Hall thruster 10 according to the present embodiment. The first embodiment employs, as a method for making the density of neutral particles in the acceleration channel 12 of the Hall thruster 10 azimuthally non-uniform, a method of dividing the diffusion chamber of the plenum chamber 24 into four, and adjusting the supplying amount of the propellant to each diffusion chamber non-uniformly with adjustment of the mass flow rate by the flow rate controller. In this method, the propellant, the supplying amount of which is adjusted non-uniformly, is supplied from each diffusion chamber of the plenum chamber 24 via the plurality of holes 13 of the distributor 37 to the anode 14, and further supplied through the anode 14 to the discharge space 11 of the acceleration channel 12. On the other hand, the present embodiment employs, as shown in FIG. 18, a method of varying the diameter of holes 13a and 13b of the distributor 37 that are provided at the upstream of the anode 14, and thereby arranging the holes 13a and 13b with different conductance. Using this method, a differential can be introduced azimuthally with respect to the mass flow rate from the holes 13a and 13b of the distributor 37 connected to (i.e., communicated with) the branching flow passage 41 of the anode 14. Here, other than the diameter of the holes 13a and 13b of the distributor 37 that are provided at the upstream of the anode 14, the depth of the holes 13a and 13b, or both of the diameter and depth of the holes 13a and 13b may be also varied to introduce a differential to the conductance of the holes 13a and 13b. In general, the conductance of a hole is proportional to the cross section area of the hole, and is inversely proportional to the depth of the hole.

As in the first embodiment, the Hall thruster 10 according to the present embodiment may be configured to have four regions as the plurality of regions, between adjacent ones of which the mass flow rate of the propellant is different, azimuthally in the discharge space 11 of the acceleration channel 12, or may be configured to have a different number of regions than four. In order not to deflect the thrust vector, it is preferable that the plurality of regions should be 2n (n is an integer being n≥2) regions. In this case, as in the first embodiment, the distributor 37 adjusts, with respect to the propellant mass flow rate $m_{tot}$ in the discharge space 11 of the acceleration channel 12, the differential $m_{dif}$ to the previously-described certain rate between the propellant mass flow rate $m_A$ (or $m_B$) in the azimuthally odd-numbered regions and the propellant mass flow rate $m_B$ (or $m_A$) in the azimuthally even-numbered regions. Hereinafter, an example of a configuration for its implementation will be explained.

The shape of the plurality of holes 13a and 13b of the distributor 37 varies according to the positions of the holes 13a and 13b. For instance, at least one of the diameter and the length varies according to the position of the holes 13a and 13b. Specifically, the plurality of holes 13a and 13b of the distributor 37 are formed in a way that, with respect to the conductance of all the holes 13a and 13b, the differential should be a certain rate between the conductance of the holes 13a penetrating to the azimuthally odd-numbered regions and the conductance of the holes 13b penetrating to the azimuthally even-numbered regions. As in the first embodiment, this rate is preferably within a range of 5 to 15%, the most preferably 10%. Here, $m_{dif}/m_{tot}$ may be made to be the above rate as a result of not only introducing a differential to the conductance of the holes 13a and 13b but also introducing a differential to the supplying amount of the propellant to the holes 13a and 13b.

FIG. 19 shows a perspective view of the diffusion chamber inside the plenum chamber 24. In the present embodiment, it is not necessary to divide the plenum chamber 24 into a plurality of sections azimuthally as shown in FIG. 19. Accordingly, it is sufficient that the plenum chamber 24 has one annular diffusion chamber internally, and also one port 26 to which the propellant is injected. Similarly, it is sufficient that a propellant injecting part 25 is provided for one port 26, and has one tubular part connected to the port 26. As in the first embodiment, the propellant is injected to the port 26 of the plenum chamber 24 after the injecting amount thereof is adjusted by the propellant injecting part 25. The propellant injected to the port 26 of the plenum chamber 24 is supplied from each of the plurality of holes 13a and 13b via the anode 14 to the discharge space 11 of the acceleration channel 12 by the distributor 37. Here, FIG. 18 shows a cross section along the line C-C of FIG. 19.

As shown in FIG. 19, in the present embodiment, it is not necessary to provide the partitions 27 as shown in FIG. 4; however, it is preferable to provide the anode 14 with the plurality of partitions 28 as shown in FIG. 3. As in the first embodiment, the partitions 28 stand from the tabular surface of the distributor 37 between the external annular wall 38 and the internal annular wall 39 of the anode 14, dividing an annular space 40 formed between the external annular wall 38 and the internal annular wall 39 into a plurality of sections azimuthally corresponding to the previously-described plurality of regions, respectively. By providing the partitions 28, it is possible to efficiently adjust the propellant mass flow rate in each of the plurality of regions. As in the first embodiment, it is preferable to make the height of the partitions 28 lower than the height from the upstream edge of the anode 14 to the opening face of the anode 14. Here, the shape of the anode 14 is not limited to the one shown in FIG. 18, but may be formed to have, for example, a cross section of a convexity. Hereinafter, an example of such configuration will be explained.

The anode 14 is a ring having a convex cross section, the inside of which is hollow. The inner side surface and the outer side surface of the ring are provided with a plurality of holes annularly along each side surface. At the upstream side of the anode 14, for instance, a ring plate for propellant distribution having a lot of holes on the circumference is provided, thereby forming the distributor 37. The holes of the anode 14 and the holes of the ring plate mutually communicate to form the plurality of holes 13a and 13b. The bottom part of the acceleration channel 12 abuts on the downstream side of the ring plate (i.e., the top face side of the ring plate). The plenum chamber 24 having a ring-shaped groove (i.e., a diffusion chamber) abuts on the upstream side of the ring plate (i.e., the bottom face side of the ring plate). The plenum chamber 24 has at least one port 26 at the bottom face of the groove. More than one ports 26 may be provided; however, it is sufficient to provide one port 26 as shown in FIG. 19. The groove of the plenum chamber 24 forms a flow passage for distributing the propellant flown from the port 26 to each hole of the ring plate (i.e., each of the plurality of holes 13a and 13b of the distributor 37). The propellant is injected from the propellant injecting part 25 to the port 26 of the plenum chamber 24 as in the first embodiment.

It is considered that, by the above configuration, as in the first embodiment, the effect to reduce the discharge current oscillation of the Hall thruster 10 in the width of operation parameter region sufficiently wide for a practical use is also achieved. Even if the Hall thruster 10 is the magnetic layer type, the effect to reduce the discharge current oscillation of the Hall thruster 10 is also achieved as in the present embodiment. Therefore, the present embodiment can be applied to both of the anode layer type and the magnetic layer type.

Embodiment 3.

Figure 20:
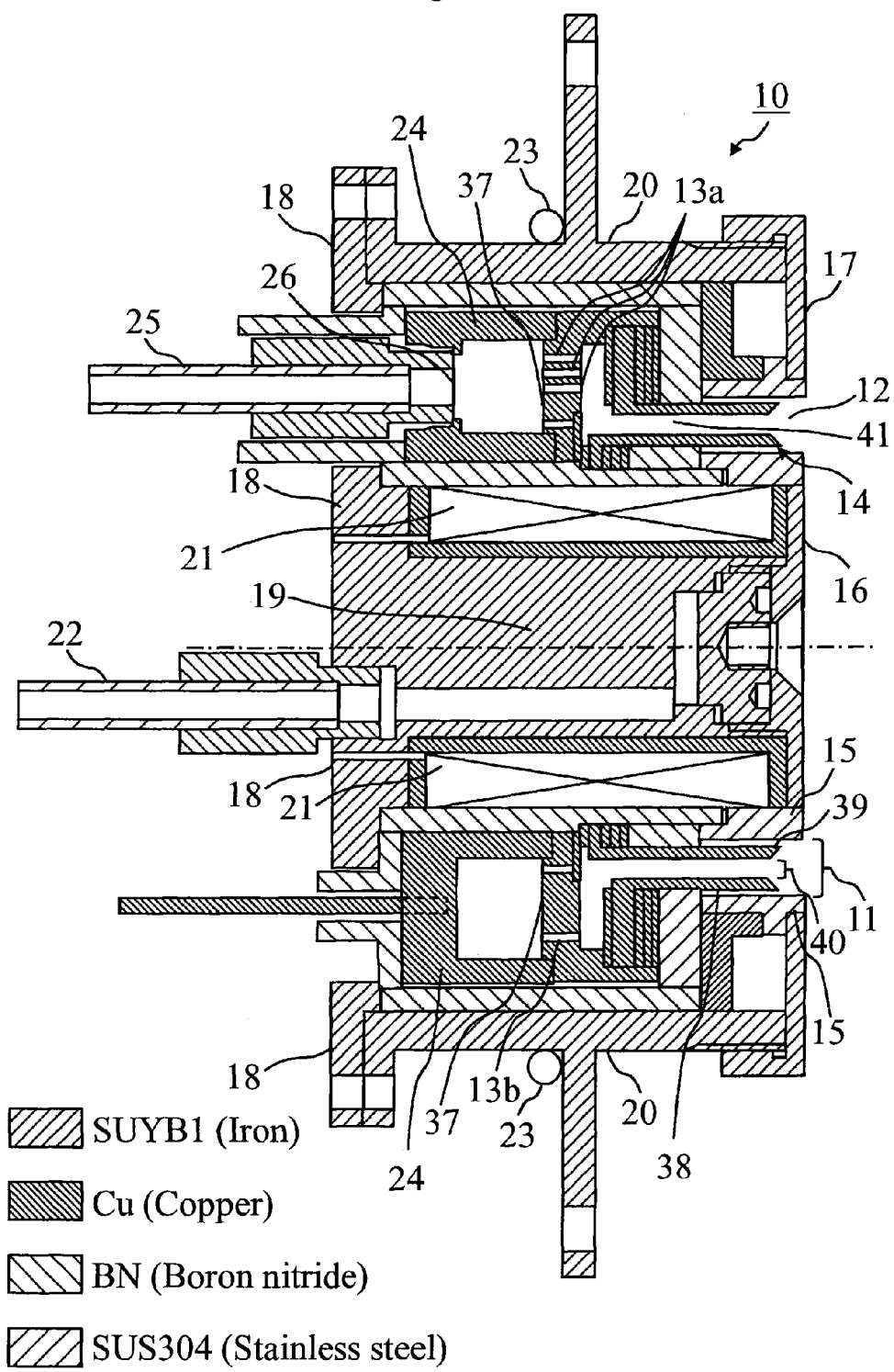
FIG. 20 is a cross sectional view of a Hall thruster according to the third embodiment.

With reference to FIG. 20, the present embodiment will be explained, focusing on the differential from the second embodiment.

FIG. 20 shows a cross sectional view of the anode layer type Hall thruster 10 according to the present embodiment. The second embodiment employs, as a method for making the density of neutral particles in the acceleration channel 12 of the Hall thruster 10 azimuthally non-uniform, a method of varying the diameter or the depth of the holes 13a and 13b of the distributor 37 and thereby arranging the holes 13a and 13b having different conductance. On the other hand, the present embodiment employs, as shown in FIG. 20, a method of introducing a density differential to the number distribution of holes 13a and 13b of the distributor 37 that are provided at the upstream of the anode 14, and thereby arranging the holes 13a and 13b. By this method, a differential can be introduced azimuthally with respect to the mass flow rate from the holes 13a and 13b of the distributor 37 connected to (i.e., communicated with) the branching flow passage 41 of the anode 14. Here, the differential may be introduced to the number distribution of the holes 13a and 13b of the distributor 37 that are provided at the upstream of the anode 14, not only in the radial direction of the Hall thruster 10, but also in the azimuthal direction of the Hall thruster 10.

As in the first embodiment, the Flail thruster 10 according to the present embodiment may be configured to have four regions as the plurality of regions, between adjacent ones of which the mass flow rate of the propellant is different, azimuthally in the discharge space 11 of the acceleration channel 12, or may be configured to have a different number of regions than four. In order not to deflect the thrust vector, it is preferable that the plurality of regions should be 2n (n is an integer being n≥2) regions. In this case, as in the first embodiment, the distributor 37 adjusts, with respect to the propellant mass flow rate $m_{tot}$ in the discharge space 11 of the acceleration channel 12, the differential $m_{dif}$ to the previously-described certain rate between the propellant mass flow rate $m_A$ (or $m_B$) in the azimuthally odd-numbered regions and the propellant mass flow rate $m_B$ (or $m_A$) in the azimuthally even-numbered regions. Hereinafter, an example of a configuration for its implementation will be explained.

The density of the plurality of holes 13a and 13b of the distributor 37 varies according to the positions of the holes 13a and 13b. Here, it is assumed that the conductance of all the holes 13a and 13b is identical. It is assumed that, for instance, the shape of all the holes 13a and 13b is identical. Specifically, the plurality of holes 13a and 13b of the distributor 37 are formed in a way that, with respect to the number of all the holes 13a and 13b, the differential should be a certain rate between the number of the holes 13a penetrating to the azimuthally odd-numbered regions and the number of the holes 13b penetrating to the azimuthally even-numbered regions. As in the first embodiment, this rate is preferably within a range of 5 to 15%, the most preferably 10%. Here, $m_{dif}/m_{tot}$ may be made to be the above rate as a result of not only introducing a differential to the density of the holes 13a and 13b but also introducing a differential to the supplying amount of the propellant to the holes 13a and 13b. Further, $m_{dif}/m_{tot}$ may be made to be the above rate as a result of not only introducing a differential to the density of the holes 13a and 13b but also, like the second embodiment, introducing a differential to the conductance of the holes 13a and 13b.

In the present embodiment, as in the second embodiment, it is not necessary to divide the plenum chamber 24 into a plurality of sections azimuthally as shown in FIG. 19. Accordingly, it is sufficient that the plenum chamber 24 has one annular diffusion chamber internally, and also one port 26 to which the propellant is injected. Similarly, it is sufficient that a propellant injecting part 25 is provided for one port 26, and has one tubular part connected to the port 26. As in the second embodiment, the propellant is injected to the port 26 of the plenum chamber 24 after the injecting amount thereof is adjusted by the propellant injecting part 25. The propellant injected to the port 26 of the plenum chamber 24 is supplied from each of the plurality of holes 13a and 13b via the anode 14 to the discharge space 11 of the acceleration channel 12 by the distributor 37. Here, FIG. 20 shows a cross section of FIG. 19 along the line C-C.

As shown in FIG. 19, in the present embodiment, it is not necessary to provide the partitions 27 as shown in FIG. 4; however, it is preferable to provide the anode 14 with the plurality of partitions 28 as shown in FIG. 3 as in the second embodiment. As in the second embodiment, it is preferable to make the height of the partitions 28 lower than the height from the upstream edge of the anode 14 to the opening face of the anode 14. Here, the shape of the anode 14 is not limited to the one shown in FIG. 20, but may be formed to have, for example, a cross section of a convexity. An example of such configuration has been discussed in the explanation of the second embodiment.

It is considered that, by the above configuration, as in the first embodiment, the effect to reduce the discharge current oscillation of the Hall thruster 10 in the width of operation parameter region sufficiently wide for a practical use is also achieved. Even if the Hall thruster 10 is the magnetic layer type, the effect to reduce the discharge current oscillation of the Hall thruster 10 is also achieved as in the present embodiment. Therefore, the present embodiment can be applied to both of the anode layer type and the magnetic layer type.

Hereinbefore, embodiments of the present invention have been explained; out of these embodiments, two or more embodiments may be combined and implemented. Or, out of the embodiments, one embodiment may be partially implemented. Alternatively, out of the embodiments, two or more embodiments may be partially combined and implemented.

Reference Signs List

10: Hall thruster; 11: discharge space; 12: acceleration channel; 13, 13a, 13b: hole; 14: anode; 15: guard ring; 16: internal magnetic pole; 17: external magnetic pole; 18: bottom wall; 19: iron core; 20: side wall; 21: solenoidal coil; 22, 23: cooling part; 24: plenum chamber; 25: propellant injecting part; 26, 26a, 26b: port; 27, 28: partition; 29: vacuum chamber; 30: cathode; 31: heater power source; 32: keeper power source; 33: coil power source; 34: main discharge power source; 35: ion collector; 36: ion collector power source; 37: distributor; 38: external annular wall; 39: internal annular wall; 40: annular space; 41: branching flow passage; and 42: merging part.

The invention claimed is:
1. A Hall thruster comprising:
an acceleration channel forming an annular discharge space, ionizing propellant flowing into the discharge space to generate ions, and accelerating and discharging the generated ions;
an anode penetrating to the discharge space of the acceleration channel;
a distributor having a plurality of holes arranged azimuthally, supplying propellant from the plurality of holes via the anode to the discharge space of the acceleration channel, an amount of the propellant varying according to positions of the plurality of holes, thereby generating a plurality of regions, between adjacent ones of which a mass flow rate of the propellant is different, azimuthally in the discharge space of the acceleration channel, and adjusting, with respect to the mass flow rate of the propellant in the discharge space of the acceleration channel, a differential within a range of 5 to 15% between the mass flow rate of the propellant in a region with a large mass flow rate of the propellant and the mass flow rate of the propellant in a region with a small mass flow rate of the propellant; and
a plenum chamber segmented into a plurality of sections azimuthally corresponding to the plurality of regions, respectively, the plenum chamber having a port to which the propellant is injected for each section; and
a propellant injecting part for injecting the propellant to the port of the plenum chamber, the propellant injecting part adjusting an injecting amount of the propellant for each section of the plenum chamber,
wherein the distributor supplies the propellant injected to the port of the plenum chamber for each section of the plenum chamber, from each one of the plurality of holes, which penetrates to a region corresponding to each section of the plenum chamber through the anode, to the discharge space of the acceleration channel.

2. The Hall thruster of claim 1,
wherein the distributor adjusts, with respect to the mass flow rate of the propellant in the discharge space of the acceleration channel, a differential within a range of 5 to 15% between the mass flow rate of the propellant in azimuthally odd-numbered regions and the mass flow rate of the propellant in azimuthally even-numbered regions.

3. The Hall thruster of claim 1,
wherein the plurality of regions are four regions, and
wherein the distributor adjusts, with respect to the mass flow rate of the propellant in the discharge space of the acceleration channel, a differential within a range of 5 to 15% between the mass flow rate of the propellant in azimuthally first and third regions and the mass flow rate of the propellant in azimuthally second and fourth regions.

4. The Hall thruster of claim 1,
wherein the propellant injecting part adjusts, with respect to the injecting amount of the propellant to all ports of the plenum chamber, a differential within a range of 5 to 15% between the injecting amount of the propellant to ports arranged at azimuthally odd-numbered sections of the plenum chamber and the injecting amount of the propellant to ports arranged at azimuthally even-numbered sections of the plenum chamber.

5. The Hall thruster of claim 1, wherein the plenum chamber is azimuthally equally segmented into the plurality of sections.

6. The Hall thruster of claim 1, wherein a shape of the plurality of holes of the distributor varies according to the positions of the plurality of holes.

7. The Hall thruster of claim 6, wherein at least one of a diameter and length of the plurality of holes of the distributor varies according to the positions of the plurality of holes.

8. The Hall thruster of claims 6,
wherein the plurality of holes of the distributor are formed so that, with respect to conductance of all the plurality of holes, a differential should be within a range of 5 to 15% between conductance of holes penetrating to azimuthally odd-numbered regions and conductance of holes penetrating to azimuthally even-numbered regions.

9. The Hall thruster of claim 1, wherein density of the plurality of holes of the distributor varies according to the positions of the plurality of holes.

10. The Hall thruster of claim 9,
wherein the plurality of holes of the distributor are arranged so that, with respect to a number of all the plurality of holes, a differential should be within a range of 5 to 15% between a number of holes penetrating to azimuthally odd-numbered regions and a number of holes penetrating to azimuthally even-numbered regions.

11. The Hall thruster of claim 1, wherein the anode includes:
an external annular wall and an internal annular wall which stand from the distributor and are arranged so as to face each other with a gap that forms an annular space communicating with the discharge space of the acceleration channel; and
a plurality of partitions which stands from the distributor between the external annular wall and the internal annular wall and segments the annular space into a plurality of sections azimuthally corresponding to the plurality of regions, respectively.

12. The Hall thruster of claim 1, wherein the distributor adjusts, with respect to the mass flow rate of the propellant in the discharge space of the acceleration channel, the differential to 10% between the mass flow rate of the propellant in the region with the large mass flow rate of the propellant and the mass flow rate of the propellant in the region with the small mass flow rate of the propellant.

13. A cosmonautic vehicle which mounts the Hall thruster of claim 1.

14. A propulsion method comprising:
by an acceleration channel, forming an annular discharge space, ionizing propellant flowing into the discharge space to generate ions, and accelerating and discharging the generated ions,
by a distributor having a plurality of holes arranged azimuthally, supplying propellant from the plurality of holes via an anode, which penetrates to the discharge space of the acceleration channel, to the discharge space of the acceleration channel, an amount of the propellant varying according to positions of the plurality of holes, thereby generating a plurality of regions, between adjacent ones of which a mass flow rate of the propellant is different, azimuthally in the discharge space of the acceleration channel, and adjusting, with respect to the mass flow rate of the propellant in the discharge space of the acceleration channel, a differential within a range of 5 to 15% between the mass flow rate of the propellant in a region with a large mass flow rate of the propellant and the mass flow rate of the propellant in a region with a small mass flow rate of the propellant;

by a plenum chamber segmented into a plurality of sections azimuthally corresponding to the plurality of regions, respectively, injecting the propellant from a port into each section; and by a propellant injecting part, adjusting an injecting amount of the propellant injected for each section of the plenum chamber, wherein the distributor supplies the propellant injected to the port of the plenum chamber for each section of the plenum chamber, from each one of the plurality of holes, which penetrates to a region corresponding to each section of the plenum chamber through the anode, to the discharge space of the acceleration channel.

* * * * *